US006654128B2

(12) United States Patent
Takayama et al.

(10) Patent No.: US 6,654,128 B2
(45) Date of Patent: Nov. 25, 2003

(54) DISPLACEMENT INFORMATION DETECTING APPARATUS

(75) Inventors: Manabu Takayama, Kamakura (JP); Masahiko Igaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/103,581

(22) Filed: Jun. 24, 1998

(65) Prior Publication Data

US 2002/0085210 A1 Jul. 4, 2002

(30) Foreign Application Priority Data

Jun. 30, 1997 (JP) .......................................... 9-190520
Jun. 30, 1997 (JP) .......................................... 9-190521

(51) Int. Cl.[7] .............................................. G01B 9/02
(52) U.S. Cl. .................. 356/499; 356/450; 250/231.16
(58) Field of Search ............................... 356/499, 450; 250/231.16, 231.18, 237 G

(56) References Cited

U.S. PATENT DOCUMENTS

| | | | | |
|---|---|---|---|---|
| 4,222,633 A | * | 10/1980 | Hock | 350/162 R |
| 4,975,570 A | * | 12/1990 | Nishimura et al. | 250/231.16 |
| 5,035,507 A | | 7/1991 | Nishioki et al. | |
| 5,104,225 A | | 4/1992 | Masreliez | |
| 5,124,548 A | * | 6/1992 | Igaki | 250/231.16 |
| 5,359,193 A | | 10/1994 | Nyui et al. | 250/237 G |
| 5,369,271 A | | 11/1994 | Nyui | |
| 5,481,106 A | | 1/1996 | Nyui et al. | 250/237 G |
| 5,483,059 A | | 1/1996 | Igaki et al. | 250/231.16 |

FOREIGN PATENT DOCUMENTS

| | | | |
|---|---|---|---|
| DE | 40 04 835 | | 5/1991 |
| EP | 0 006 482 | | 1/1980 |
| EP | 0 448 982 | | 10/1991 |
| JP | 36-11793 | * | 7/1936 |

OTHER PUBLICATIONS

A.G. Sedukhin, "Diffraction reticles: The Capabilities of novel optical components for displacement or distance measurement," 85, No. 2, pp. 47–52 (1990).

* cited by examiner

*Primary Examiner*—Frank G. Font
*Assistant Examiner*—Andrew H. Lee
(74) *Attorney, Agent, or Firm*—Fitzpatrick, Cella, Harper & Scinto

(57) ABSTRACT

This invention relates to a displacement information detecting apparatus which has a light beam illuminating system for making a light beam enter a first area of the grating portion of a relatively displaceable scale member provided with a grating portion having a wavefront dividing function in the direction of grating arrangement, a reflecting member for reflecting the light beam having emerged from the first area into which the light beam has been made to enter by the light beam illuminating system to enter a second area which is in a direction substantially perpendicular to the grating arrangement relative to the first area, and a plurality of light receiving portions for receiving a plurality of light beams created by the wavefront dividing function in the second area into which the light beam has been made to enter by the reflecting member, a signal corresponding to the displacement relative to the scale member being provided by the light reception by each of the light receiving portions.

12 Claims, 25 Drawing Sheets

LR 1 2 3 3a 5b 5c 5a 5 3b 6 4

31d
31e
31
4
31a
31b
2
101
1
5b
5c
5a
5
103
X
Y
Z

X-Z PLANE
Y-Z PLANE
4
DISPLACEMENT DIRECTION (X)
31
L(−1)
L(0)
L(+1)
31a
31b
Z
X
Y

WAVELENGTH OF LIGHT SOURCE λ=632.8 (nm)
SLIT NUMBERS N=5000
LIGHT INCIDENCE AREA 0.4×0.4(mm)
LIGHT INCIDENCE AREA PITCH 15—15.6 (μm)
Δ
4a
4
4b
102
3
3e
3a
3b
102a
101
101a (2500P/R)
SCALE PITCH AND SUPERPOSED PITCH WITH RESPECT TO DECENTERED AMOUNT Δ
SUPERPOSED PITCH
SCALE PITCH
SUPERPOSED PITCH, SCALE PITCH [mm]
0.082
0.081
0.08
0.079
0.078
0.077
0.076
1
1.2
1.4
1.6
1.8
2
2.2
2.4
SCALE POSITION (DISTANCE FROM INCIDENCE PRINCIPAL RAY) [mm]
R OF CONCAVE MIRROR = 3 [mm]
DECENTERRED AMOUNT WITH RESPECT TO INCIDENCE LIGHT ON CONCAVE MIRROR Δ =0.62 [mm]

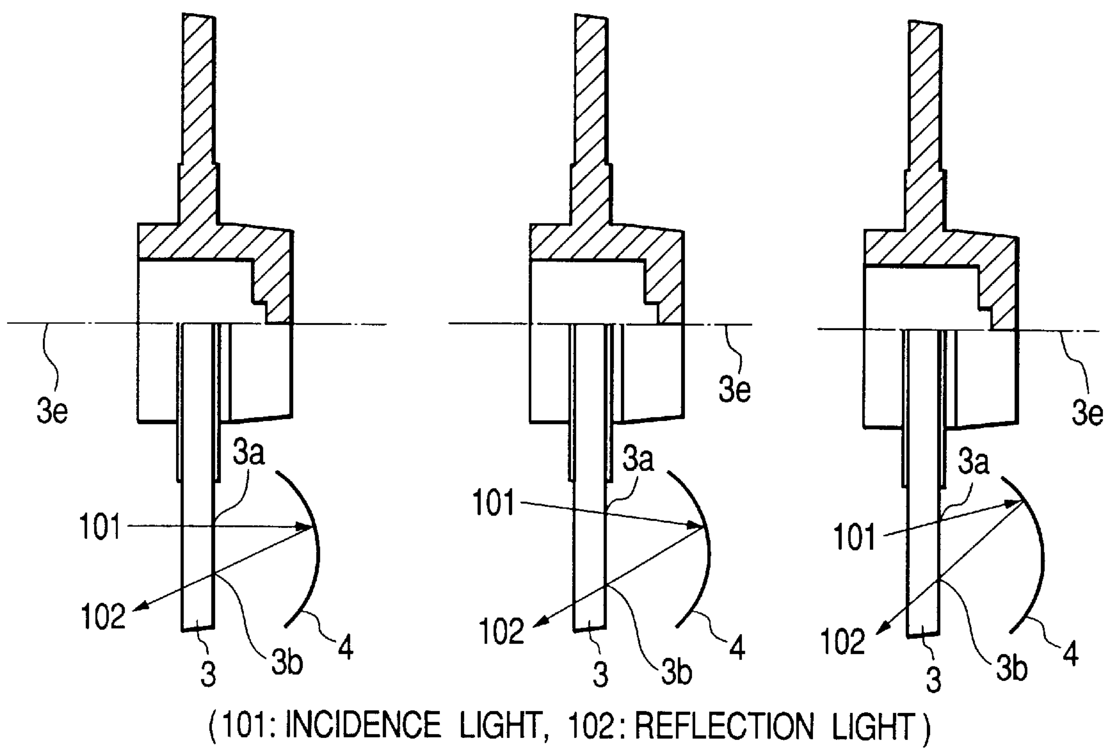
(101: INCIDENCE LIGHT, 102: REFLECTION LIGHT)
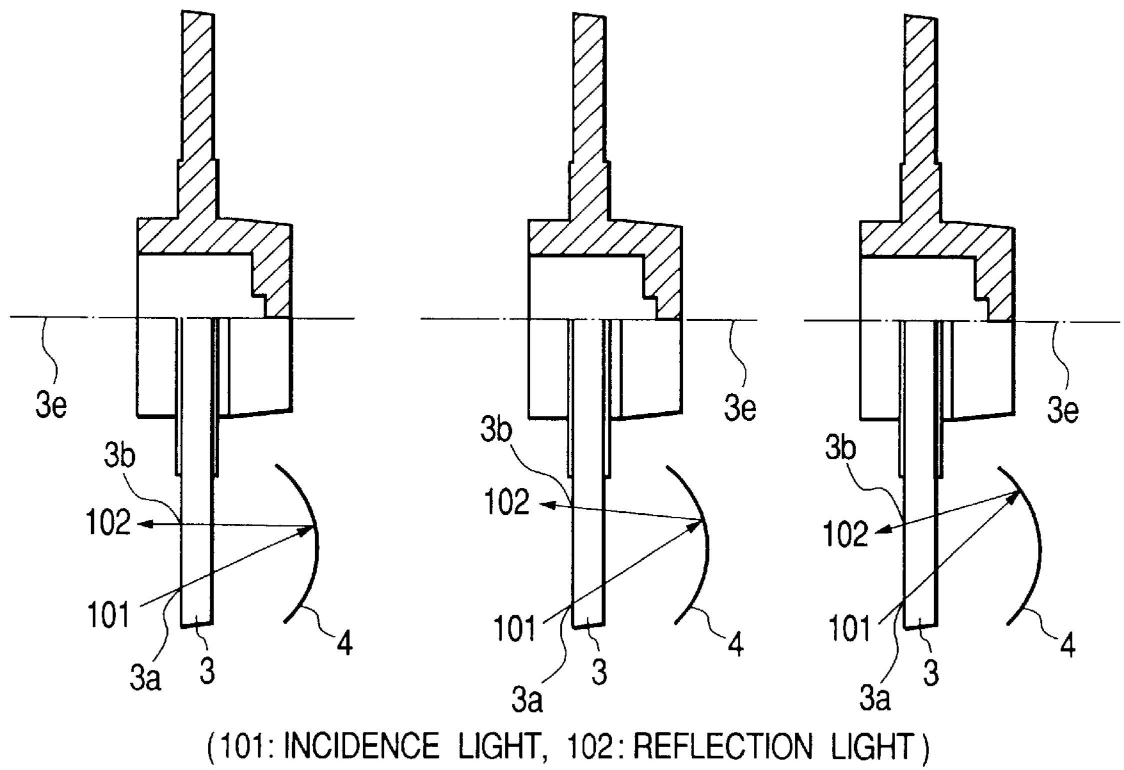
(101: INCIDENCE LIGHT, 102: REFLECTION LIGHT)

DISPLACEMENT INFORMATION DETECTING APPARATUS

BACKGROUND OF THE INVENTION

1. Field of the Invention

This invention relates to a displacement information detecting apparatus, and particularly to the field of displacement measurement for optically measuring displacement information such as the amount of displacement of an object and the displacement speed of an object.

2. Related Background Art

An encoder has heretofore been widely used to measure the amount of displacement, the displacement speed, etc. of an object. Most of methods of optically measuring them use a movable grating and a reference grating.

(a-1) Generally, the reference grating is provided integrally with a light source and a light receiving portion, and is also called a fixed grating.

(a-2) On the other hand, as a special detecting system, there is proposed a displacement measuring apparatus having a detecting optical system by a construction using a portion of a movable grating as a reference grating as disclosed in Japanese Patent Publication No. 36-11793, i.e., a so-called self-projection type construction.

Particularly, an encoder is of a simple construction and yet can detect an amount of angular displacement, an amount of movement, etc. and is therefore widely used in machine tools and measuring apparatuses.

FIG. 1 of the accompanying drawings is a schematic view of the essential portions of an encoder proposed in Japanese Patent Publication No. 36-11793. In FIG. 1, a light beam from a light source 201 passes through an opening 202*a* formed in a base plate 202, whereafter it enters a first area 204*a* of an optical scale 204 as a displaceable object provided with a radial grating (linear grating) as a substantially parallel light beam by means of a lens system 203.

The light from the grating of the first area 204*a* of the optical scale 204 is introduced to a second area 204*b* of the optical scale 204 through a lens system 205, a corner cube 206 and a lens system 207, and forms a grating image on the surface thereof. The light beam which had passed through the second area 204*b* is condensed by a lens system 208 and is detected by a light receiving element 209.

When at this time, the optical scale 204 moves in the direction of arrow 204*c*, the image formed on the optical scale 204 is displaced in the opposite direction and therefore, a signal of a period twice as great as the grating resolving power (grating pitch) is obtained in the light receiving element 209.

The encoder shown in FIG. 1 obtains the displacement information of the optical scale 204 by the utilization of the periodic signal obtained by the light receiving element 209.

A system using this self-projection type detecting optical system has the following features:

(b-1) A detecting head which does not depend on the grating pitch can be realized.

(b-2) A periodic signal of double multiplication of the grating resolving power is obtained.

Industrially, the feature (b-1) has a great merit in the market of encoder of which various resolving powers are required, and a detecting head of high flexibility having no resolution dependency can be provided, and the lower cost by mass production is possible. Also, high resolving power detection is possible by the feature (b-2).

Because of a position detecting system having the detecting optical system by the self-projection type construction having many excellent features as described above, there is required a method of obtaining a phase difference signal of 2CH or greater necessary as an encoder by a more compact construction.

SUMMARY OF THE INVENTION

It is a first object of the present invention to provide, in a displacement measuring apparatus having the above-described self-projection type detecting optical system according to the conventional art, an information detecting apparatus using a phase difference detecting system which can be made more compact.

It is a second object of the present invention to provide a displacement information detecting apparatus suitable for a linear encoder or the like which can reduce the space for the disposition of each member and can achieve the simplification of the entire apparatus and can alleviate the allowable error of the disposition of each member and yet can detect the displacement information of a displaceable object.

Other objects of the present invention will become apparent from the following detailed description of some embodiments of the invention.

BRIEF DESCRIPTION OF THE DRAWINGS

FIGS. 16A, 16B and 16C are illustrations showing the incident state of a light beam onto the optical scale in Embodiment 2 of the present invention.

FIGS. 17A, 17B and 17C are illustrations showing another form of the incident state of a light beam onto the optical scale in Embodiment 2 of the present invention.

DESCRIPTION OF THE PREFERRED EMBODIMENTS

Figure 1:
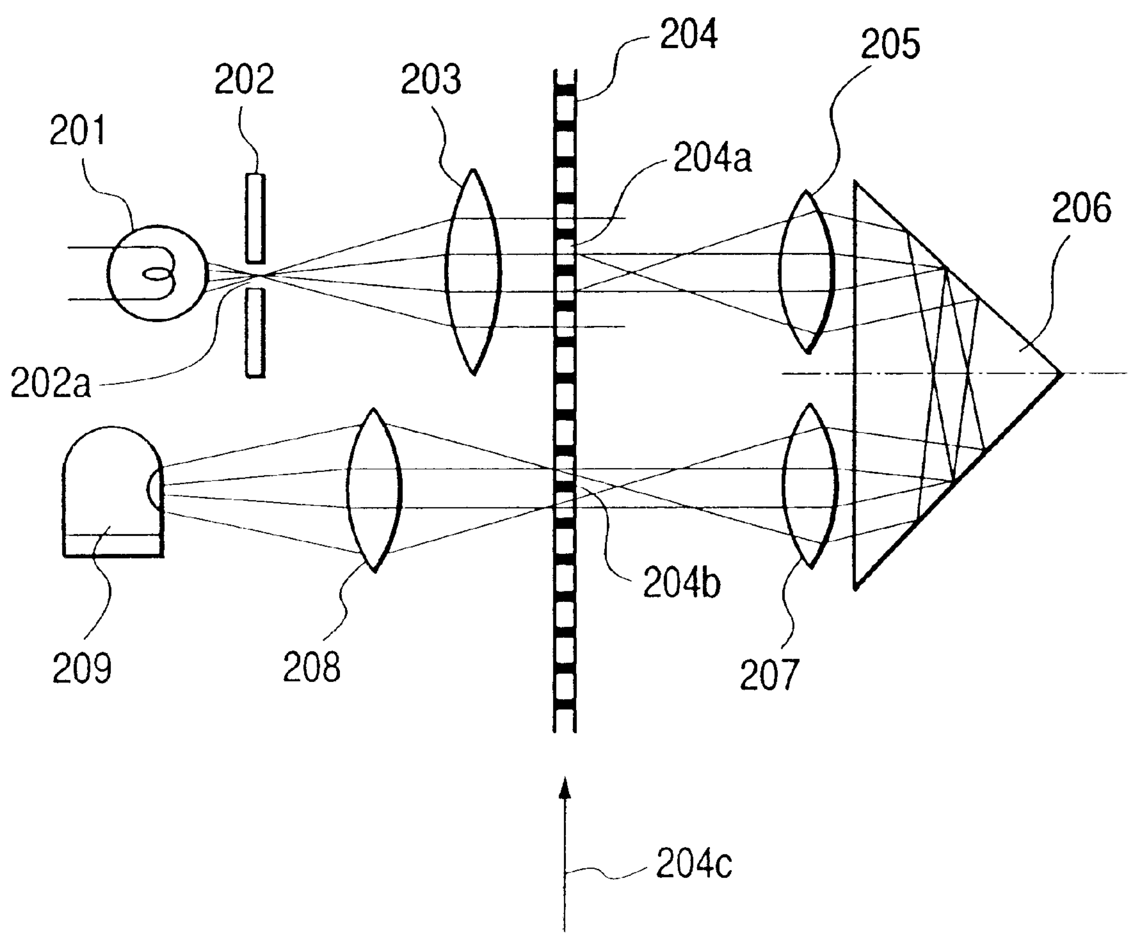
FIG. 1 is a schematic view of the essential portions of an encoder according to the conventional art.
Figure 2:
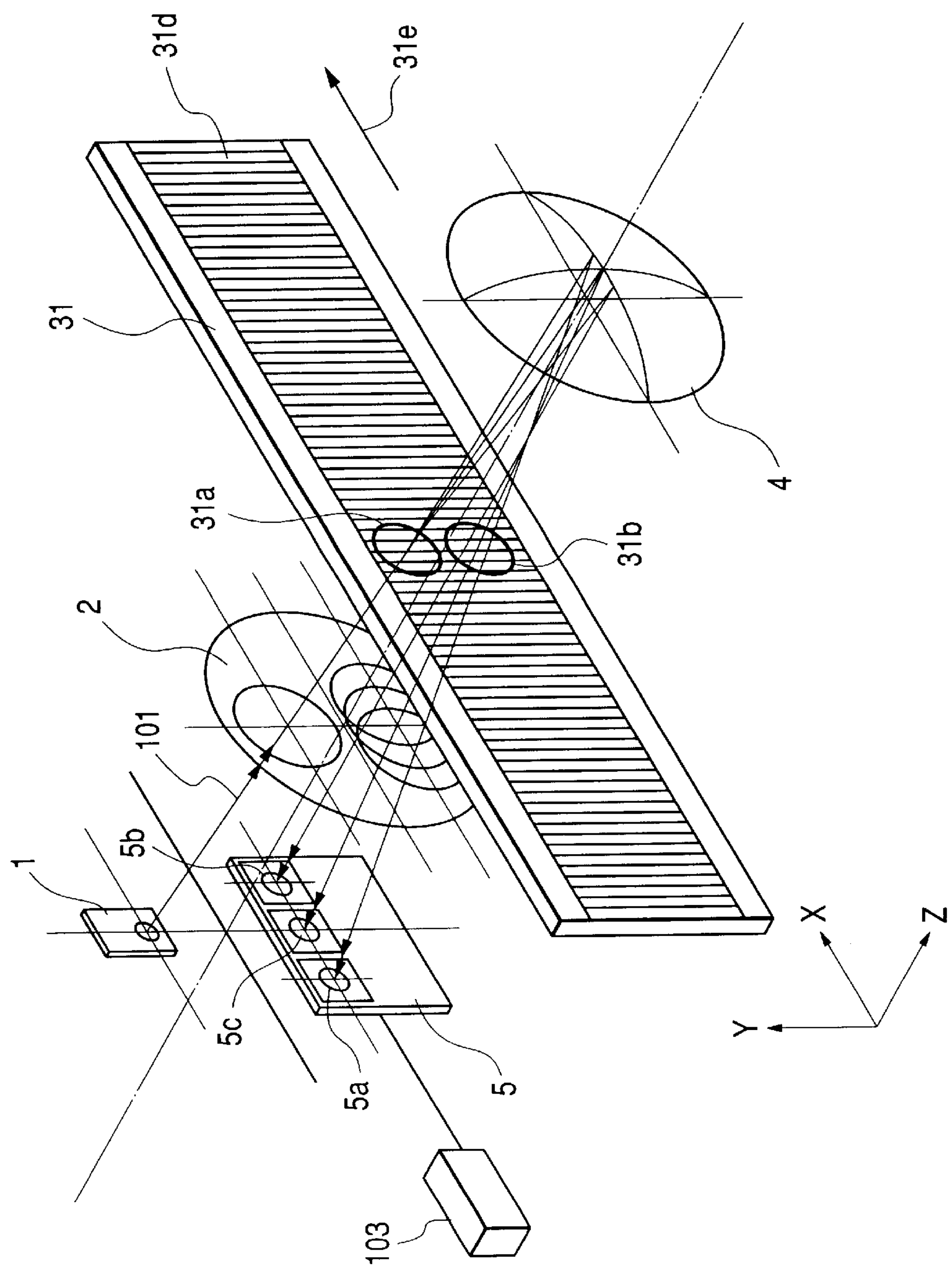
FIG. 2 is a perspective view of the essential portions of Embodiment 1 of the present invention.
Figure 3:
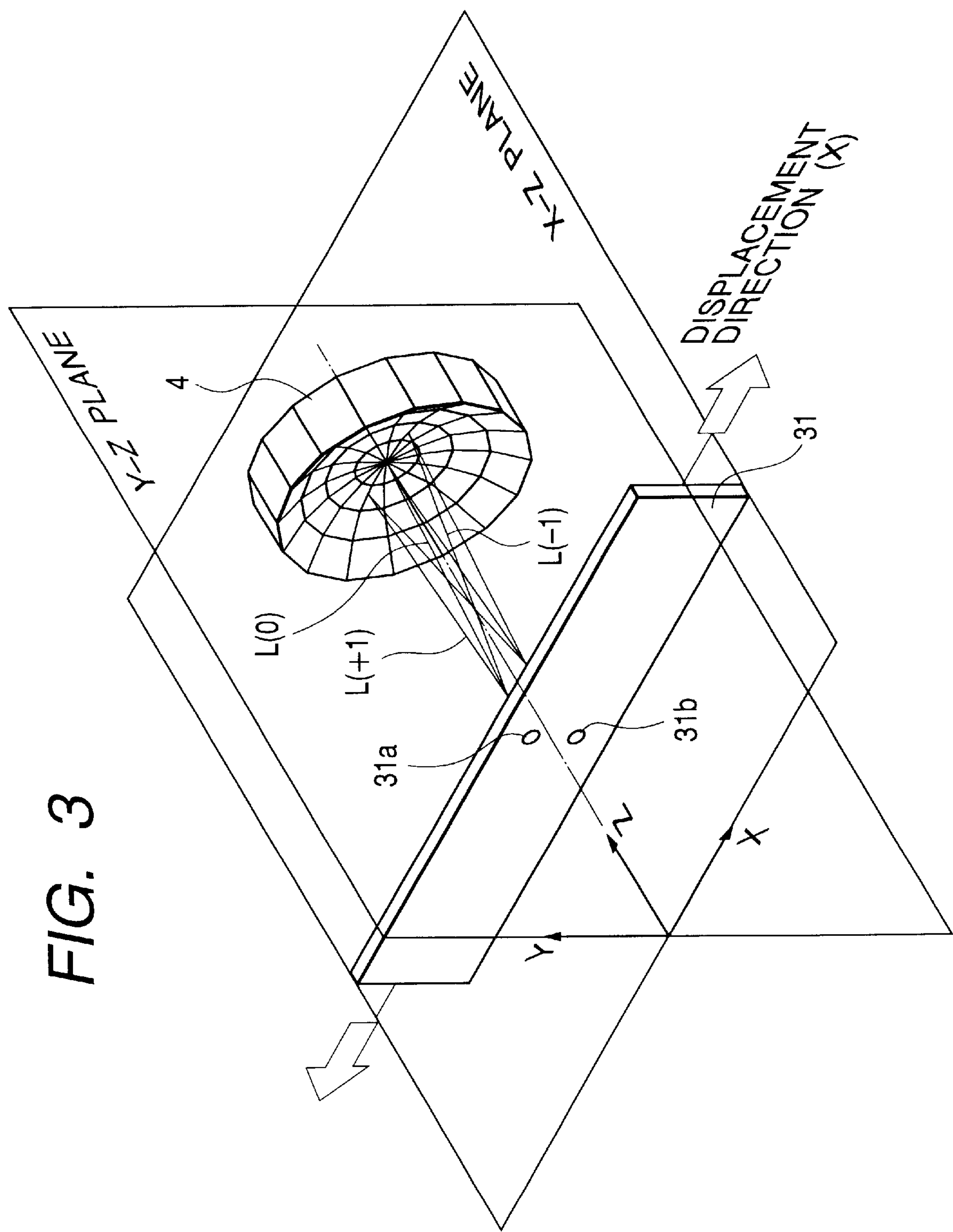
FIG. 3 is a perspective view of the essential portions of Embodiment 1 of the present invention.
Figure 4:
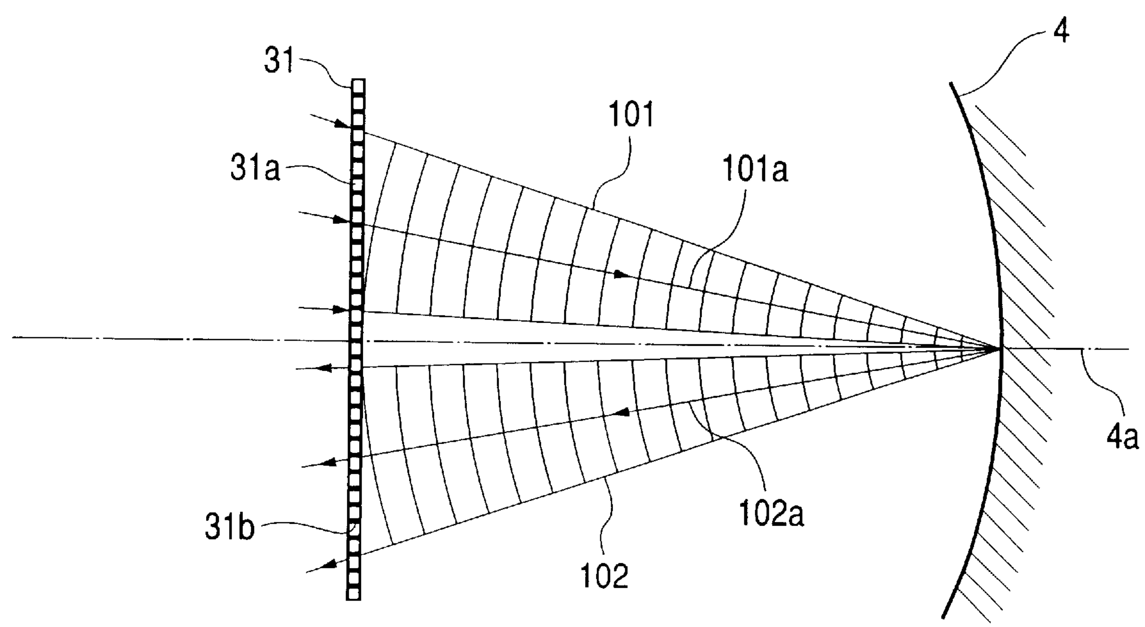
FIG. 4 is an illustration of a portion of Embodiment 1 of the present invention.
Figure 5A:
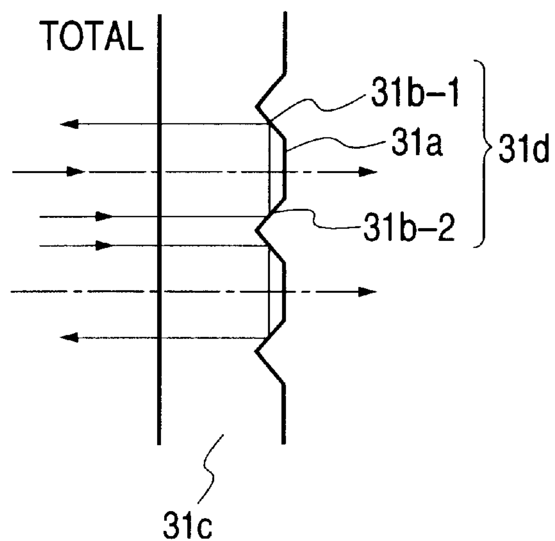
FIGS. 5A, 5B and 5C are illustrations of a portion of Embodiment 1 of the present invention.
Figure 5B:
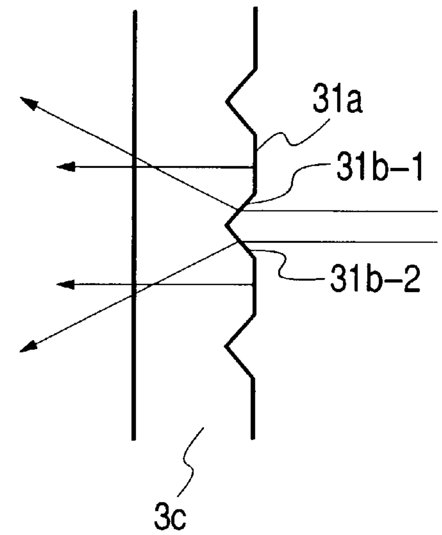
Figure 5C:
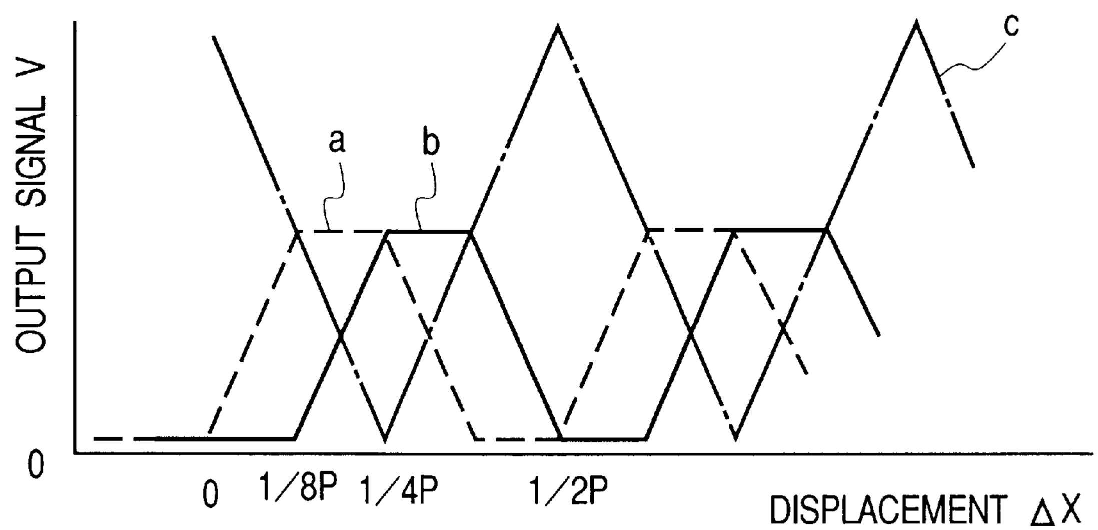

FIGS. 2 and 3 are perspective views of the essential portions of Embodiment 1 of the present invention, FIG. 4 is an illustration of a portion of Embodiment 1 of the present invention, and FIGS. 5A to 5C are illustrations of a portion of Embodiment 1 of the present invention.

In these figures, the reference numeral 1 designates a light source comprised, for example, of an LED or a semiconductor laser which emits a coherent light beam of a wavelength λ (632.8 nm). The reference numeral 2 denotes a lens system comprising a spherical lens or an aspherical lens which condenses the light beam from the light source 1 and directs it to an optical scale 31 which will be described later.

The light source 1 and the lens system 2 each constitute an element of light illuminating means LR. The reference numeral 31 designates an optical scale having the phase difference detecting function and the amplitude type diffraction grating function.

The optical scale 31 is fixed relative to a moving object (not shown) and moves in a direction indicated by arrow 31*e*. The optical scale 31 is provided with a grating portion 31*d* having a black-and-white pattern, V-grooves or the like formed at a predetermined pitch in a direction orthogonal to the direction of movement on a base plate 31*c*.

In the present embodiment, there is shown a case where V-grooves are used. FIGS. 5A and 5B are detailed views of the grating portion 31*d* of the optical scale 31, and two inclined surfaces 31*b*-1 and 31*b*-2 constituting a straight V-groove portion and a flat surface portion 31*a* are alternately arranged at a predetermined pitch P to thereby form the grating portion 31*d*. The width of the V-groove is (½)P, and each of the two inclined surfaces 31*b*-1 and 31*b*-2 forming the V-groove has a width of (¼)P, and is inclined at a critical angle or greater, in the present embodiment, θ=45°, with respect to the flat portion 31*a*.

In the present embodiment, of the diffracted lights from the optical scale 31, three light beams, i.e., 0th-order diffracted light and ±first-order diffracted lights, are utilized. Here, the grooves of this grating portion 31*d* are made linear relative to the direction of movement of the optical scale 31.

In the present embodiment, the material of the optical scale 31 is plastic such as polycarbonate or acryl, and the optical scale is made by a method such as injection molding, compression molding, sheet molding or replica. The reference numeral 4 denotes a concave mirror comprising a spherical mirror, an elliptical mirror, a parabolic mirror, an aspherical mirror or the like. The concave mirror 4 is coincident with the Fouries transformation surface of the grating portion 31*d*.

In the present embodiment, each element is set so that a light beam 101 condensed by the lens system 2 and having entered a first area 31*a* of the optical scale 31 as shown in FIG. 3 may be diffracted by the optical scale 31 and at this time, the nth-order diffracted light (0th-order and ±first-order diffracted lights L(0), L(+1) and L(−1)) may be condensed on or near the surface 4*b* of the concave mirror 4 (on or near the pupil position of the concave mirror 4).

As shown in FIG. 4, the principal ray 101*a* of the incident light beam 101 and the principal ray 102*a* of a re-incident light beam 102 reflected by the concave mirror 4 and onto the optical scale 31 are symmetrical with respect to the optical axis 4*a* of the concave mirror 4. Also, the concave mirror 4 reflects convergent light beams (three diffracted light beams) transmitted from the optical scale 31, and forms an interference image by the superposition of the three light beams on a second area 31*b* on the surface of the optical scale 31 (that is, superposes the three diffracted lights one upon another and forms an interference fringe). When at this time, the optical scale 31 is moved in the direction of arrow 31*e*, the re-formed image moves in a direction opposite to the direction of arrow 31*e*. That is, the grating portion and the interference pattern image are displaced relative to each other at a value double with respect to the amount of movement of the optical scale 31.

In the present embodiment, movement information of resolving power double that of the grating portion constructed on the optical scale 31 is obtained thereby.

The reference numeral 5 designates light receiving means having three photodetectors (light receiving elements) 5*a*, 5*b* and 5*c* for receiving through the lens system 2 three light beams provided by a light beam based on the phase relation between the interference pattern formed near the second area 31*b* of the grating portion 31*d* of the optical scale 31 and the V-grooves of the grating portion being geometrically refracted by and emerging from the second area 31*b*. The signal from this light receiving means 5 is processed by signal processing means 103 having a pulse count circuit and a discrimination circuit for the direction of movement, and movement information is obtained therefrom.

The light source 1, the lens system 2 and the light receiving means 5 are fixed and held in a housing. This housing and the concave mirror 4 are mutually in a fixedly disposed relation.

Description will now be made of a method of detecting the movement information of the optical scale (moving object) 31 in the present embodiment. The light beam from the LED 1 which is an element of the light illuminating means may be condensed on or near the reflecting surface 4*b* of the concave mirror 4 by the lens system 2. This convergent light is made to enter the first area 31*a* on the grating portion 31*d* of the optical scale 31. Of the convergent light which has entered the first area 31*a*, a ray of light which has arrived at the first area, namely, flat surface portion 31*a* of the grating portion 31*d* shown in FIGS. 5A and 5B passes this flat surface portion 31*a* and travels to the concave mirror 4, and is imaged on the surface thereof. Also, a ray of light which has arrived at the inclined surface 31*b*-1 constituting the V-groove and is also totally reflected on the inclined surface 31*b*-2 because the angle of inclination of the inclined surface 31*b*-1 is set to the critical angle or greater.

Thus, the ray of light which has finally arrived at the inclined surface 31*b*-1 of the grating portion 31*d* does not enter the concave mirror, but is returned toward-in the direction of incidence. Likewise, the ray of light which has arrived at the other inclined surface 31*b*-2 constituting the V-groove repeats total reflection and is returned. Accordingly, the light beam arriving at the area of the two inclined surfaces 31*b*-1 and 31*b*-2 forming the V-groove in the first area 31*a* does not enter the concave mirror but is reflected thereby, and only the ray of light which has arrived at the flat surface portion 31*a* travels through the optical scale 31 to the concave mirror 4.

That is, in the first area 31*a*, the V-groove type grating portion 31*d* has optical action similar to that of a transmission type amplitude diffraction grating. The light beam is diffracted by this grating portion 31*d* of the first area 31*a*, and 0th-order, ±first-order, ±second-order, . . . diffracted lights are created by the action of the grating portion, and those diffracted lights are condensed on the surface of the concave mirror 4. The condensed diffracted lights are reflected symmetrically with respect to an optical axis 4*a*, as shown in FIG. 4, and are re-imaged on the second area 31*b* of the optical scale 31, and re-form an image of one-to-one magnification on the surface of the optical scale 31.

Here, the first area 31*a* and the second area 31*b* are areas different relative to the grating portion 31*d* of the linear grating (which may partly overlap each other) orthogonal to the direction of movement of the surface of the optical scale 31. At this time, the grating pitches of the first area 31*a* and the second area 31*b* are same because the optical scale 31 has the straight grating portion 31*d*.

In the present embodiment, the grating portion 31*d* of the first area 31*a* is projected onto the second area 31*b* on the grating portion 31*d* at one-to-one magnification so that an image (an inverted image) similar to the pitch of the grating portion 31*d* of the optical scale 31 may be formed. For this purpose, in the present embodiment, the concave mirror 4 is set to have a desired radius of curvature R, so that the principal ray 101*a* of the incident light beam 101 and the principal ray 102*a* of the re-incident light beam 102 may be symmetrical with respect to the optical axis 4*a*.

Thereby, a detection signal of good S/N ratio is obtained in such a manner that the pitches of the grating coincide with each other when the image of the grating portion of the first area 31*a* is re-formed on the surface of the second area 31*b* by the concave mirror 4.

The light beam which has entered the flat surface portion 31*a* in the second area 31*b* is rectilinearly transmitted as shown in FIG. 5B, and arrives at the central photodetector 5*c* of the light receiving means 5. Also, the rays of light which have arrived at the two inclined surfaces 31*b*-1 and 31*b*-2 forming the V-groove surfaces enter the respective surfaces at an angle of incidence of 45° and therefore, are greatly refracted in different directions and arrive at the photodetectors 5*a* and 5*b* at the opposite sides of the light receiving means 5.

Thus, in the second area 31*b*, the light beam is divided into three directions and travels by the three kinds of surfaces differing in the direction of inclination from one another, i.e., the two inclined surfaces 31*b*-1 and 31*b*-2 inclined in different directions with respect to the incident light beam and the flat surface portion 31*a* between the V-grooves, and arrives at the photodetectors 5*a*, 5*b* and 5*c* provided at positions corresponding to the respective surfaces. That is, in the second area 31*b*, the grating portion 31*d* of the V-groove functions as a light wavefront dividing element.

That is, a light beam based on the phase relation between the grating portion of the second area 31*b* and the interference pattern image formed on the surface thereof is deflected toward in three directions and enters the photodetectors 5*a*, 5*b* and 5*c*.

Here, when the optical scale 31 is moved, the quantities of light detected by the respective photodetectors 5*a*, 5*b* and 5*c* change. The balance among the quantities of light entering the respective photodetectors changes in conformity with the relative displacement of the position of the grating portion 31*d* and the position of the image and as the result, assuming that the optical scale 31 has been moved in the direction of movement 31*e*, there is obtained a change in quantity of light resulting from the movement of the optical scale 31 as shown in FIG. 5C. In FIG. 5C, the axis of abscissas represents the amount of displacement of the optical scale 31 and the axis of ordinates represents the quantity of received light.

Signals a, b and c correspond to the photodetectors 5*a*, 5*b* and 5*c*, respectively. When the optical scale 31 is moved in the opposite direction, the signal a becomes the output of the photodetector 5*b* and the signal b becomes the output of the photodetector 5*a* and the signal c becomes the output of the photodetector 5*c*. On the basis of these signals, there is obtained movement information such as the movement speed and the direction of movement of the optical scale 31.

Figure 21:
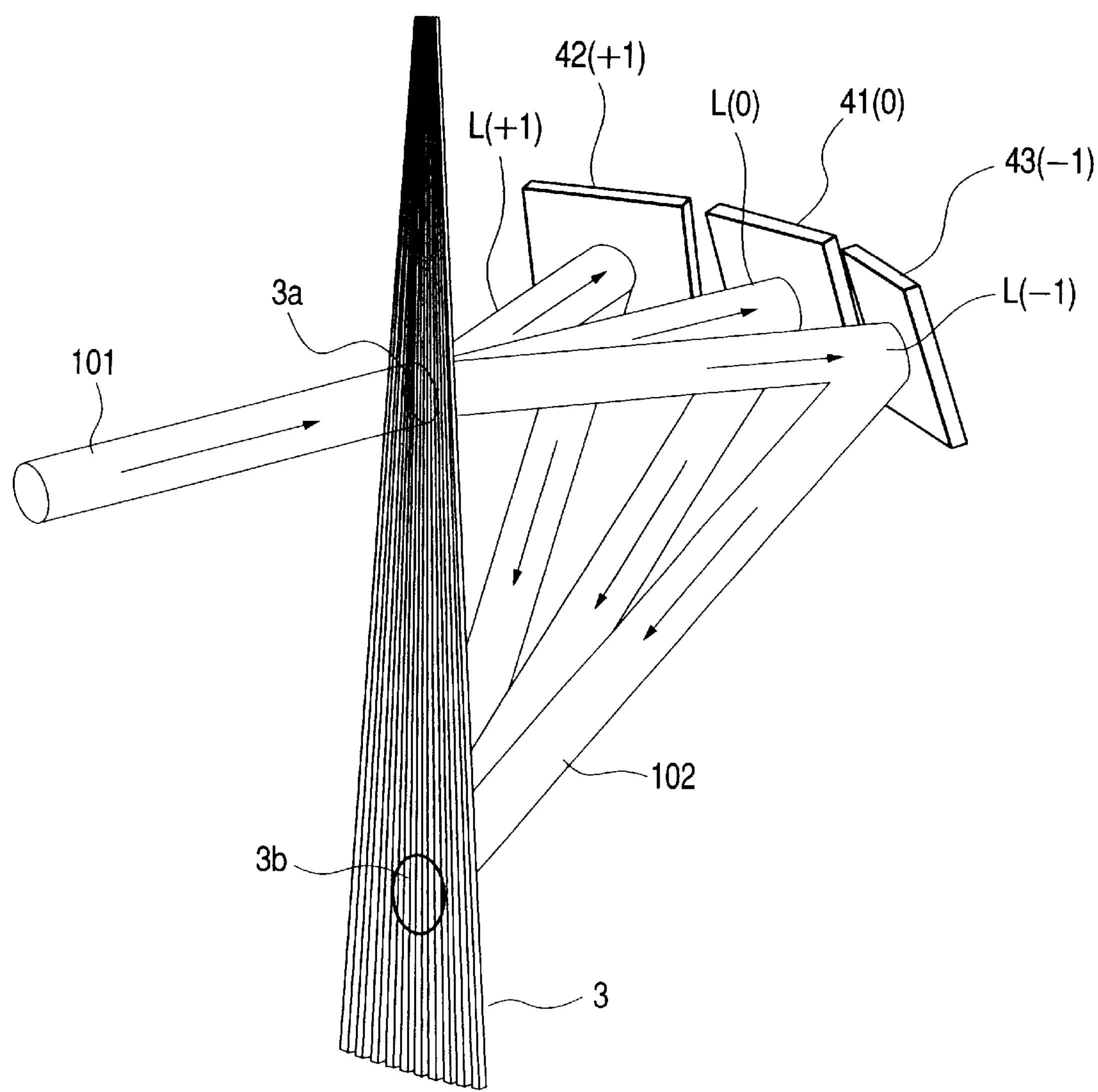
FIG. 21 is an enlarged perspective view of a portion of FIG. 20.

In the present embodiment, design may be made such that the light beam from the LED 1 is collimated by the lens system 2 and is made to enter the first area 31*a* of the optical scale 31 and ±nth-order diffracted lights and 0th-order light from the optical scale 31 are reflected by a flat mirror and are made to enter the second area 31*b* of the optical scale 31 and images (interference fringes) by the three diffracted lights are formed on the surface thereof and the three lights from the second area 31*b* are received by the light receiving elements 5*a*, 5*b* and 5*c*. That is, the grating image formed on the second area is not limited to one by an ordinary imaging element such as the concave mirror shown in FIGS. 2 and 3, but may be an image by an interference fringe pattern formed on the area of intersection among three light beams, for example, by an element as shown in FIG. 21 which will be described later.

Figure 6:
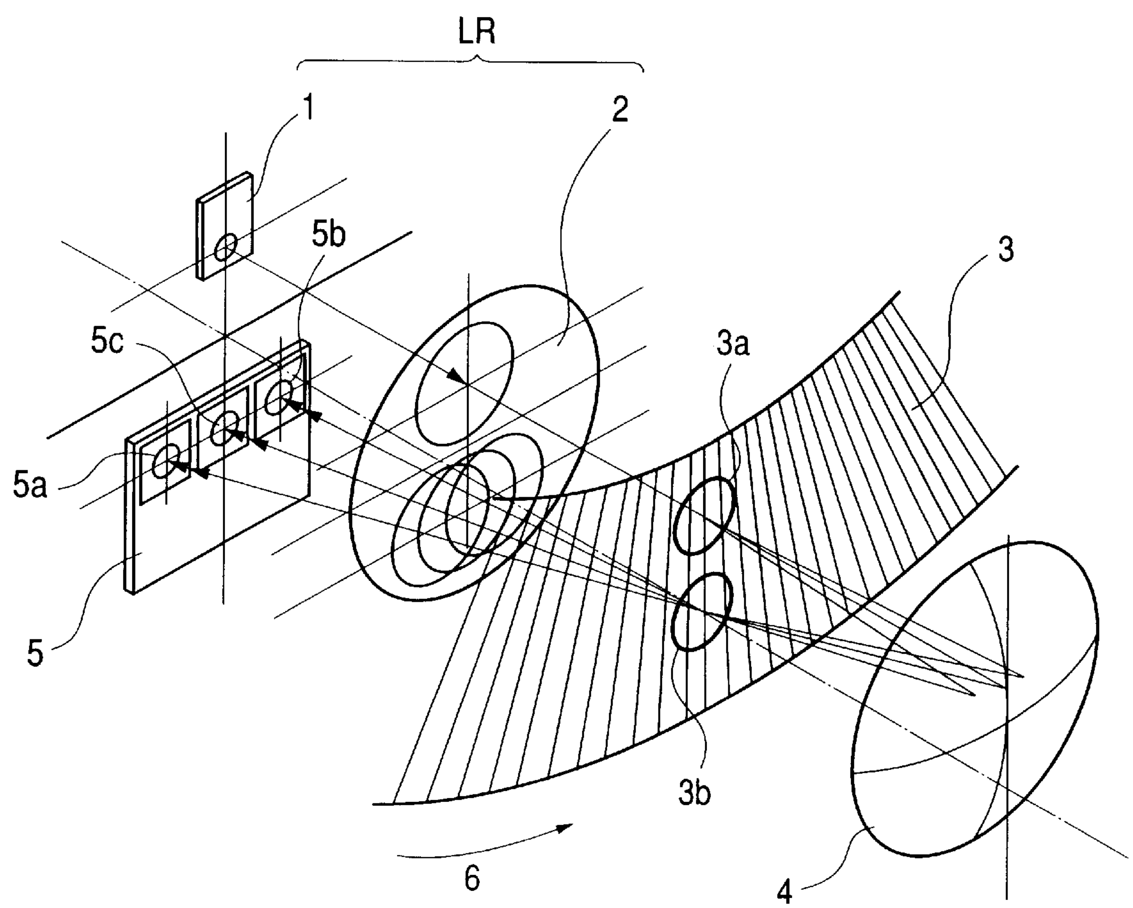
FIG. 6 is a perspective view of the essential portions of Embodiment 2 of the present invention.
Figure 7:
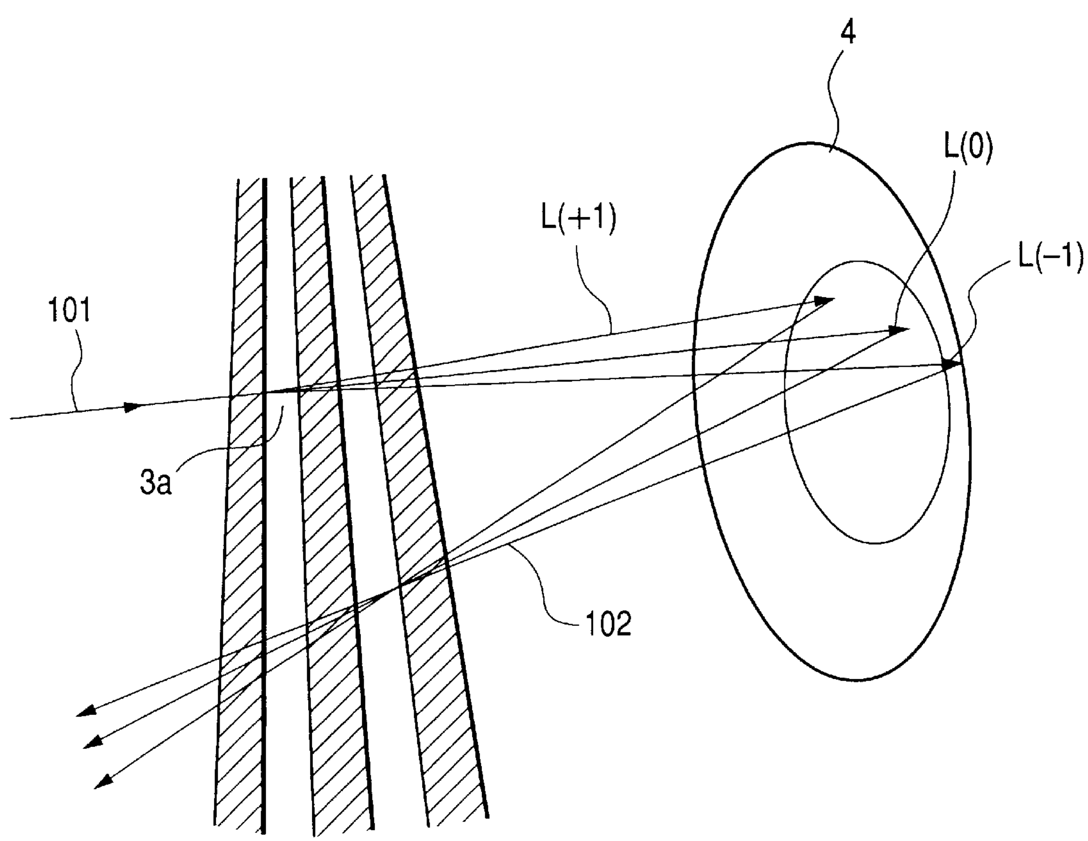
FIG. 7 is a perspective view of the essential portions of Embodiment 2 of the present invention.
Figure 8:
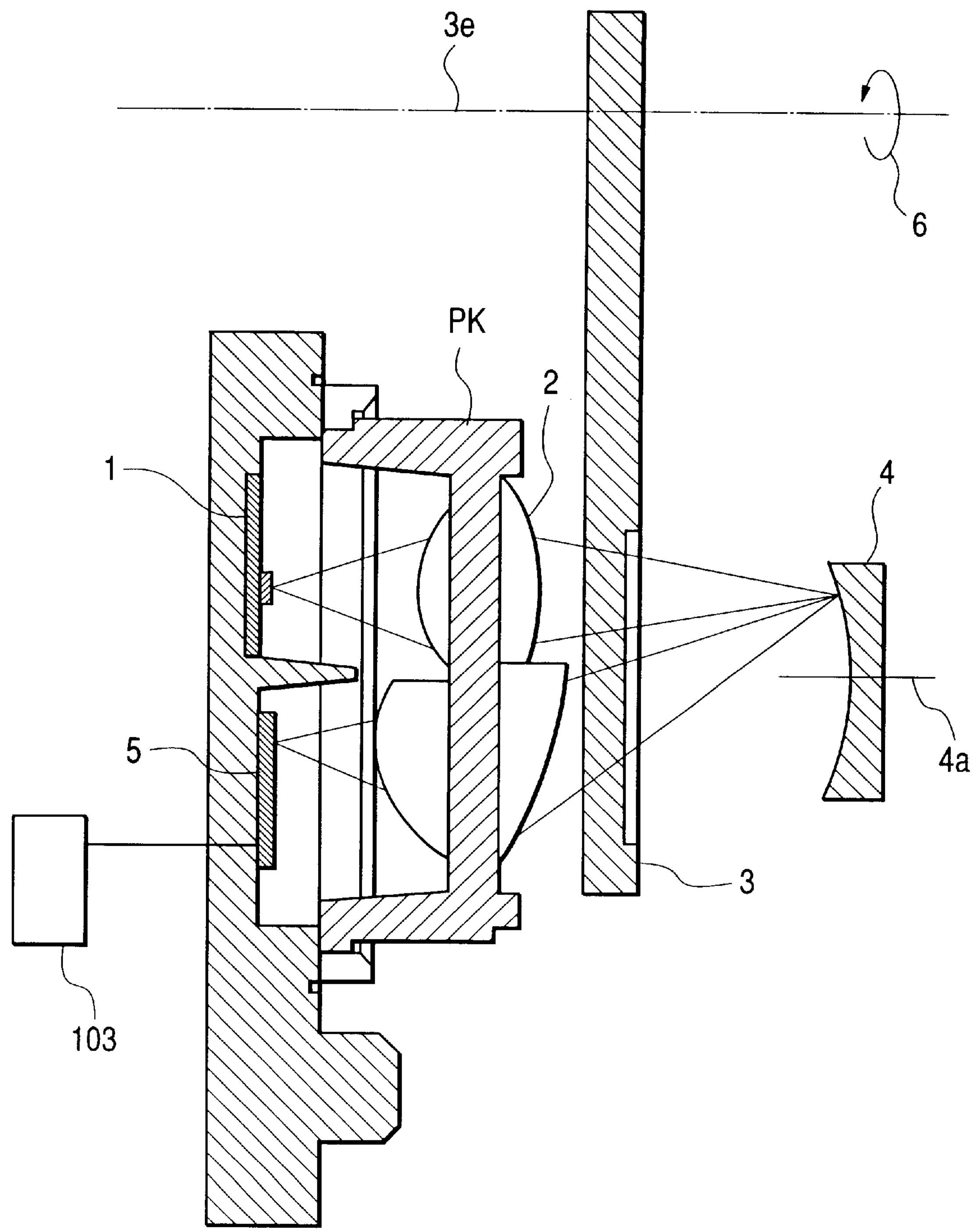
FIG. 8 is a cross-sectional view of the essential portions of Embodiment 2 of the present invention.
Figure 9:
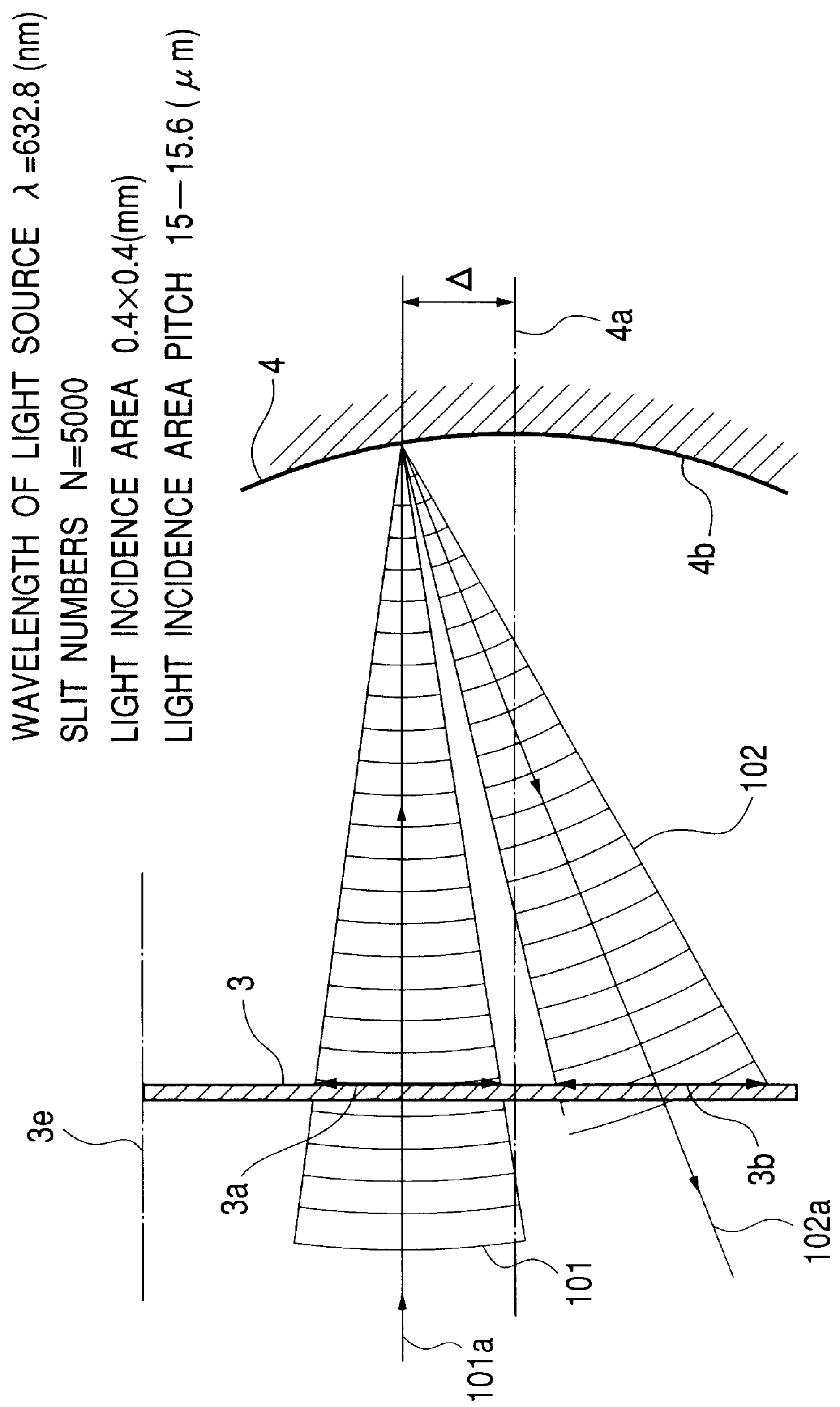
FIG. 9 is an illustration of an optical scale and a concave mirror in Embodiment 2 of the present invention.
Figure 10:
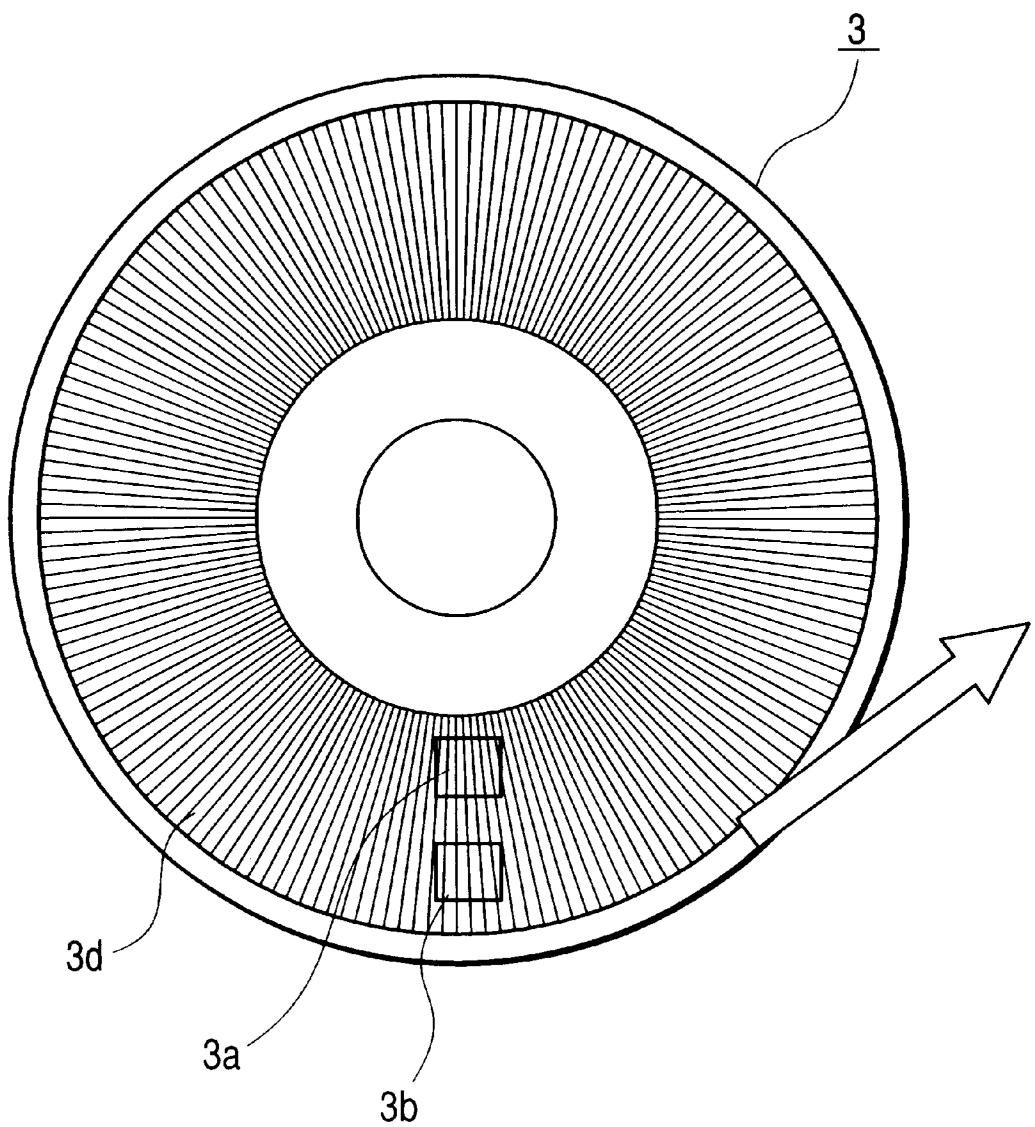
FIG. 10 is an illustration of the optical scale in Embodiment 2 of the present invention.
Figure 11A:
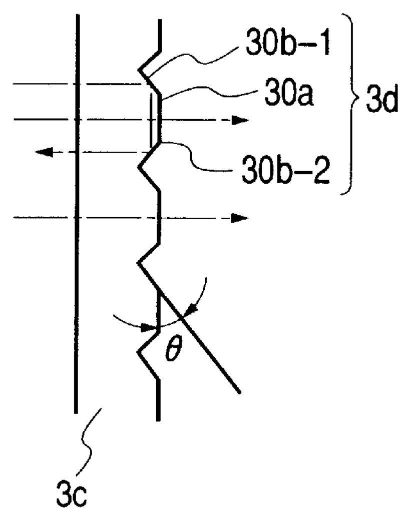
FIGS. 11A, 11B and 11C are illustrations of the grating portion of the optical scale and a signal from light receiving means in Embodiment 2 of the present invention.
Figure 11B:
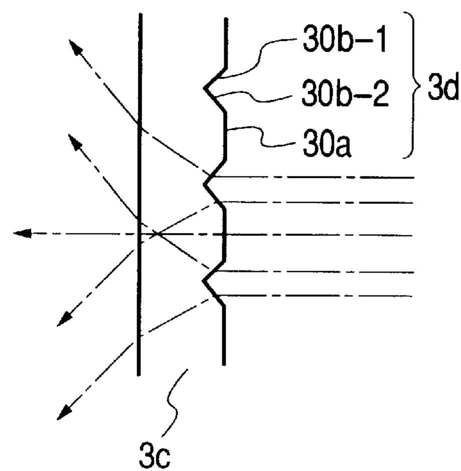
Figure 11C:
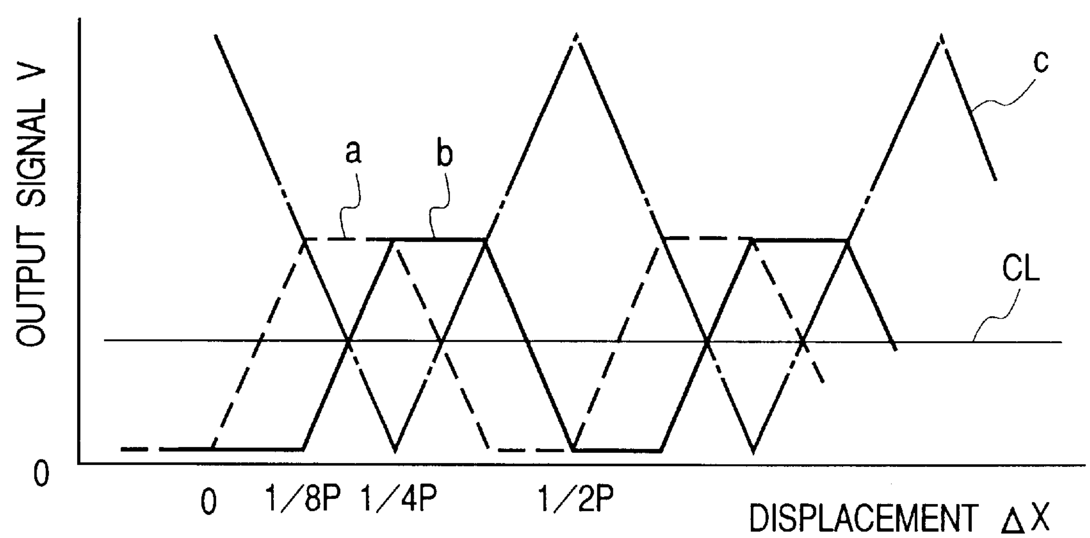
Figure 12:
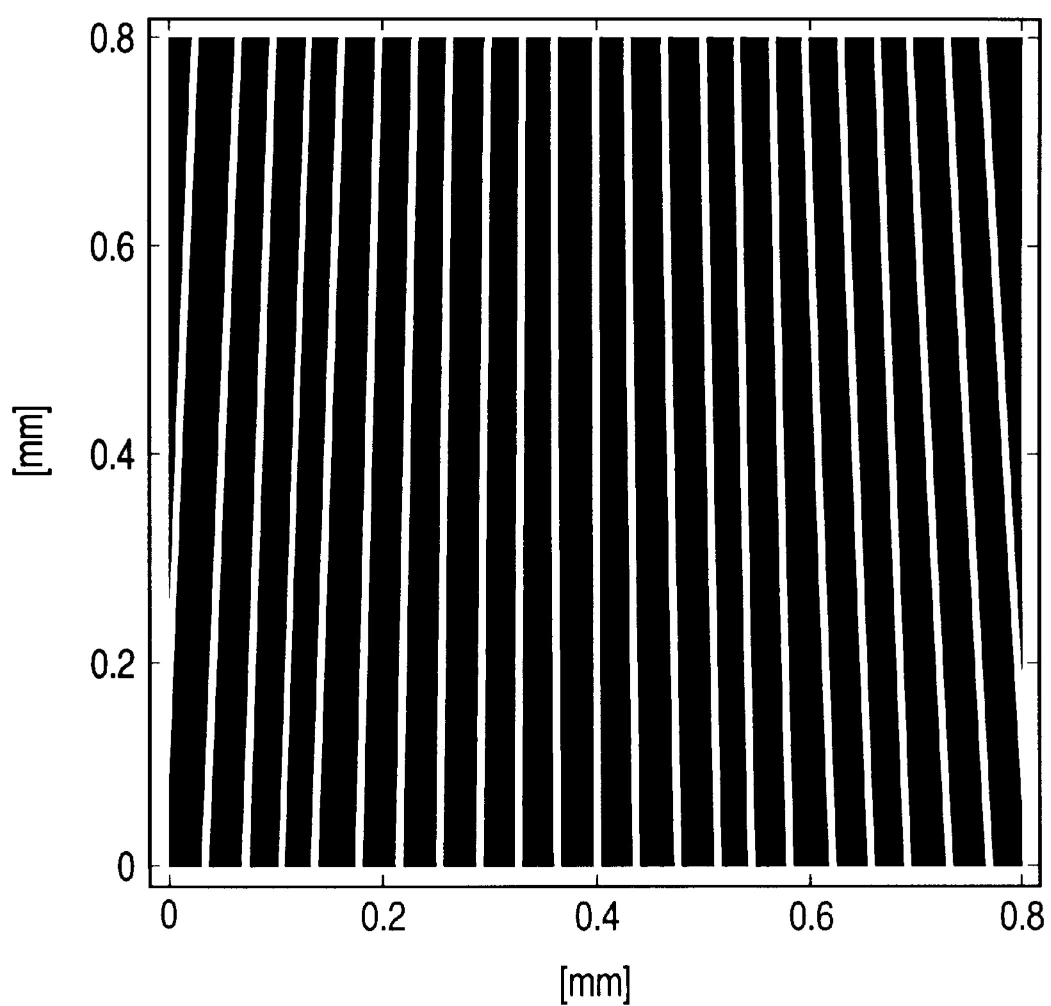
FIG. 12 is an illustration of an image re-formed on the optical scale in Embodiment 2 of the present invention.
Figure 13:
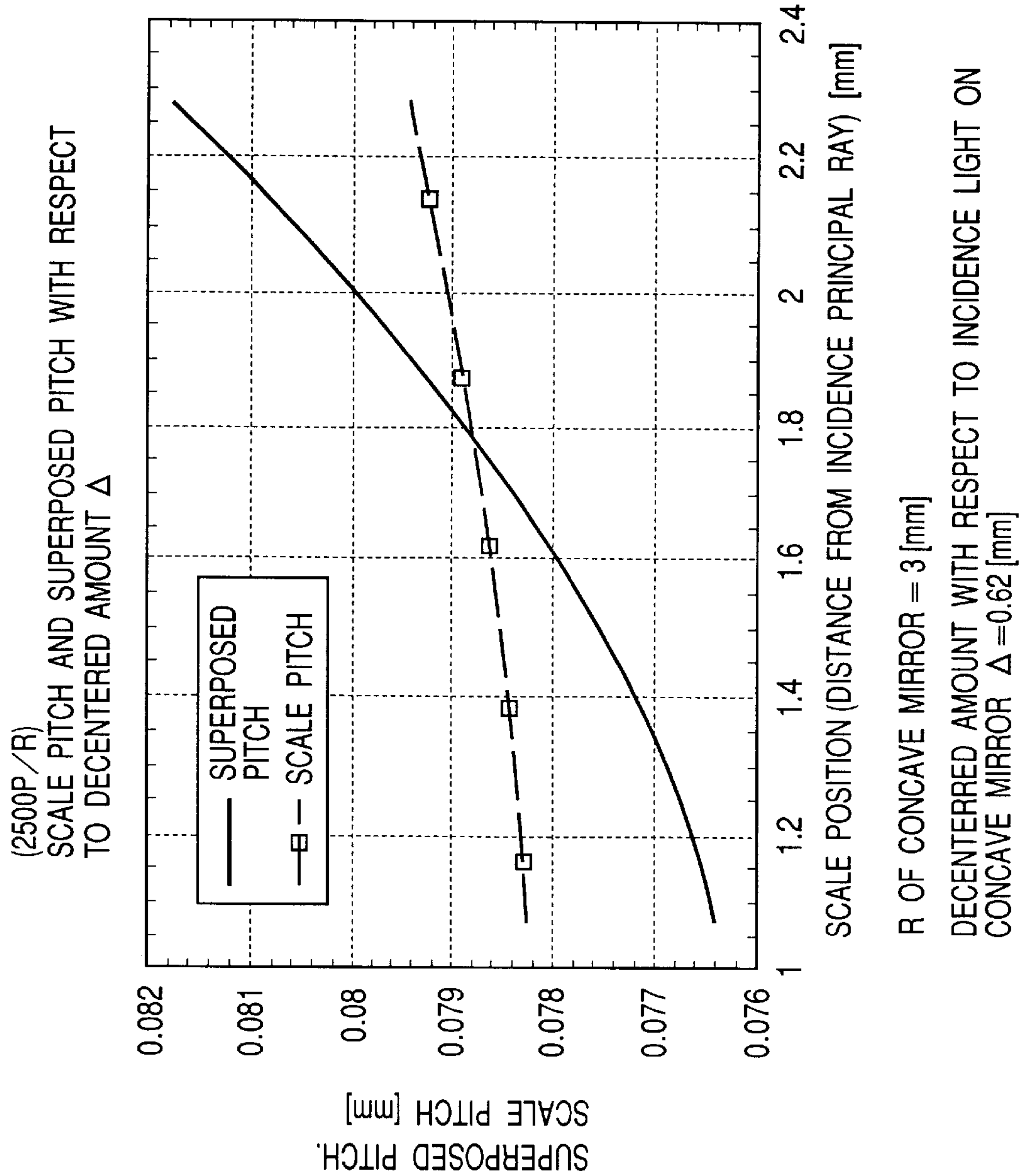
FIG. 13 is an illustration of a scale pitch and a superposed pitch with respect to the decentered amount of a concave surface in Embodiment 2 of the present invention.
Figure 14:
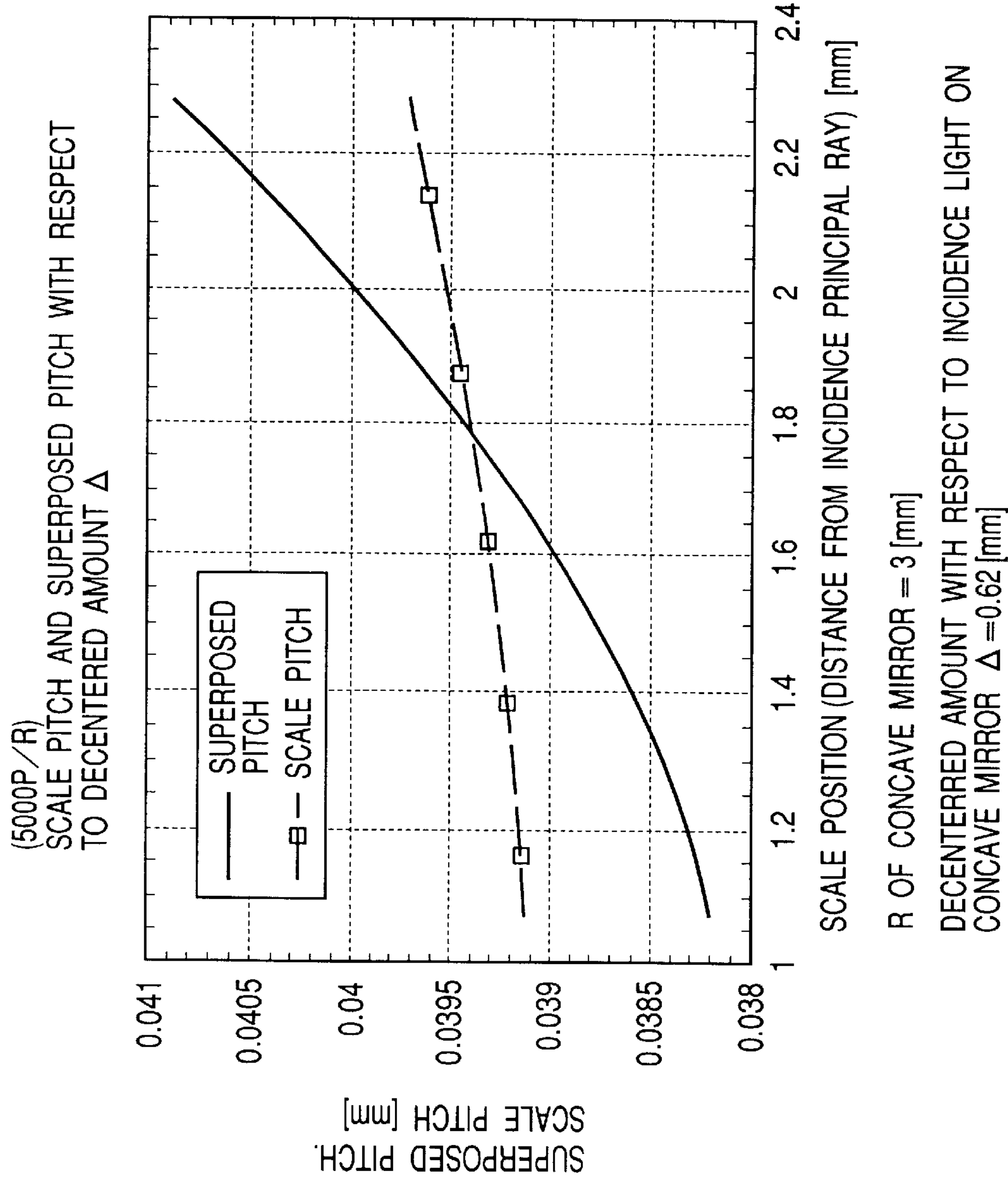
FIG. 14 is an illustration of the scale pitch and the superposed pitch with respect to the decentered amount of the concave mirror in Embodiment 2 of the present invention.
Figure 15A:
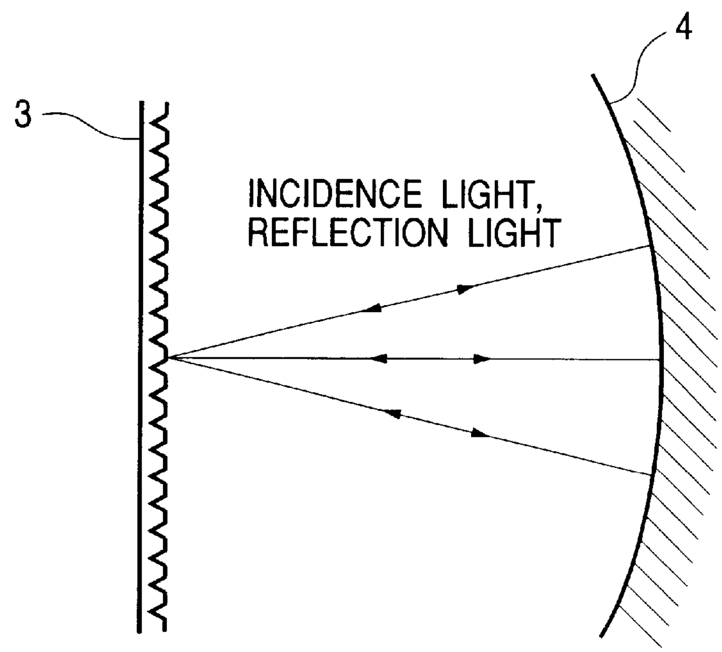
FIGS. 15A and 15B are cross-sectional views of the essential portions of Embodiment 2 of the present invention.

FIGS. 6 and 7 are perspective views of the essential portions of Embodiment 2 of the present invention, FIG. 8 is a cross-sectional view of the essential portions of Embodiment 2 of the present invention, FIG. 9 is an illustration of an optical scale and a concave mirror in Embodiment 2 of the present invention, FIG. 10 is an illustration of the optical scale in Embodiment 2 of the present invention, FIGS. 11A, 11B and 11C are illustrations of the grating portion of the optical scale in Embodiment 2 of the present invention and a signal from light receiving means, FIG. 12 is an illustration of an image re-formed on the optical scale Embodiment 2 of the present invention, FIG. 13 is an illustration of a scale pitch and a superposed pitch to the decentered amount of a concave mirror in Embodiment 2 of the present invention, FIG. 14 is an illustration of the scale pitch and the superposed pitch to the decentered amount of the concave mirror in Embodiment 2 of the present invention, FIGS. 15A and B are cross-sectional views of the essential portions of Embodiment 2 of the present invention, FIGS. 16A to 16C are illustrations of another embodiment showing the incident state of a light beam onto the optical scale in Embodiment 2 of the present invention, and FIGS. 17A to 17C are illustrations of another embodiment showing an incident state of the light beam onto the optical scale in Embodiment 2 of the present invention.

In these figures, the reference numeral 1 designates a light source comprised, for example, of an LED or a semiconductor laser which emits a coherent light beam of a wavelength λ (632.8 nm). The reference numeral 2 denotes a lens system which, in the present embodiment, comprises a form in which a spherical lens or an aspherical lens is partly juxtaposed and which condenses the light beam from the light source 1 on one side and directs it to an optical scale 3 which will be described later.

The light source 1 and the lens system 2 each constitute an element of light illuminating means LR. The reference numeral 3 designates an optical scale having the phase difference detecting function and the amplitude type diffraction grating function, and provided with a grating portion 3*d* comprising a plurality of radial gratings (V-groove gratings having 2500 or 5000 slits) of a predetermined period on the surface of a disc-like base plate 3*c* as shown in FIGS. 10 and 11A to 11C. The base plate 3*c* of the optical scale 3 is formed of a optically transmitting optical material such as polycarbonate or plastic, and is mounted on a portion of a rotatable member (not shown) and is rotating toward in the direction of arrow 6 about a rotary axis 3*e* with the rotatable member.

FIGS. 11A and 11B are detailed views of the grating portion 3*d* of the optical scale 3, and two inclined surfaces 30*b*-1 and 30*b*-2 constituting a V-groove portion and a flat surface portion 30*a* are alternately arranged at a predetermined pitch P to thereby form the grating portion 3*d*. The width of the V-groove is (½)P, and each of the two inclined surfaces 30*b*-1 and 30*b*-2 forming the V-groove has a width of (¼)P, and each of the inclined surfaces 30*b*-1 and 30*b*-2 is inclined at a critical angle or greater, in the present embodiment, θ=45°, with respect to a straight line linking the bottom of the V-groove and a perpendicular to the flat portion 30*a* together.

In the present embodiment, of the diffracted lights from the optical scale 3, three light beams, i.e., 0th-order diffracted light and ±first-order diffracted lights, are utilized. Here, the V-grooves of the grating portion 3*d* are formed radially relative to the optical scale 3 and therefore, the pitch differs between the inner peripheral side and the outer peripheral side of the optical scale 3. Here, the pitch is defined as the value of the sum of the width of the circumferential flat portion 30*a* and the width of the two inclined surfaces 30*b*-1 and 30*b*-2.

In the present embodiment, the material of the optical scale 3 is polycarbonate or plastic and the optical scale is made by a manufacturing method such as injection molding or compression molding. The reference numeral 4 designates a concave mirror comprising a spherical mirror, an elliptical mirror, a parabolic mirror, an aspherical mirror or the like. The concave mirror 4 coincides with the Fourier transformation surface of the grating portion 3*d*.

In the present embodiment, each element is set so that a light beam 101 condensed by the lens system 2 and having entered a first area 3*a* of the optical scale 3 as shown in FIGS. 8 and 9 may be diffracted by the grating portion of the optical scale 3 and at this time, nth-order diffracted light (0th-order and ±first-order diffracted lights L(0), L(+1) and L(−1)) may be condensed on or near the surface 4*b* of the concave mirror 4 (at or near the pupil position of the concave mirror 4).

The optical axis 4*a* of the concave mirror 4 and the central ray (principal ray) 101*a* of the incident light beam 101 are decentered with respect to each other by a decentered amount Δ as shown in FIG. 9. The concave mirror 4 reflects convergent light beams (three diffracted light beams L(0), L(+1) and L(−1)) diffracted and condensed by the optical scale 3, and forms an interference pattern image (image) based on the three diffracted lights as shown in FIG. 12 on the second area 3*b* on the surface of the optical scale 3. When at this time, the optical scale 3 is moved toward in the direction of rotation 6, the formed image moves in a direction opposite to the direction of rotation 6. That is, the grating portion and the interference pattern image are displaced relative to each other at a value double the amount of movement of the optical scale 3.

In the present embodiment, rotation information of resolving power of double multification of the grating portion constructed on the optical scale 3 is obtained thereby.

The reference numeral 5 designates light receiving means having three photodetectors (light receiving elements) 5*a*, 5*b* and 5*c* for receiving three light beams provided by a light beam based on the phase relation between the interference pattern as shown in FIGS. 11A to 11C formed near the second area 3*b* of the grating portion 3*d* of the optical scale 3 and the V-groove of the grating portion being geometrically refracted by the second area 3*b* and emerging therefrom, and passed through the other side of the lens system 2 than the side during incidence. A signal from this light receiving means 5 is processed by a signal processing circuit 103 having a pulse count circuit and a discriminating circuit for the direction of rotation, and rotation information is obtained therefrom. The light source 1, the lens system 2 and the light receiving means 5 are fixed and held in a housing PK. The housing PK and the concave mirror 4 are in a fixedly disposed relation.

Description will now be made of a method of detecting the rotation information of the optical scale (rotatable member) 3 in the present embodiment. Design is made such that a light beam from LED 1 which is an element of light illuminating means is condensed on or near the reflecting surface 4*b* of the concave mirror 4 by the lens system 2. This convergent light is made to enter the first area 3*a* on the grating portion 3*d* of the optical scale 3, as shown in FIGS. 8 and 9. Of the convergent light which has entered the first area 3*a*, a ray of light which has arrived at the flat surface portion 30*a* of the grating portion 3*d* shown in FIGS. 11A to 11C passes the flat surface portion 30*a* and travels to the concave mirror 4, and is imaged on the surface thereof. Also, a ray of light which has arrived at the inclined surface 30*b*-1 constituting the V-groove is totally reflected as shown in FIGS. 11A to 11C and is directed to the other inclined surface 30*b*-2 constituting the V-groove and is also totally reflected on the inclined surface 30*b*-2 because the angle of inclination of the inclined surface 30*b*-1 is set to a critical angle or greater.

The ray of light which has thus finally arrived at the inclined surface 30*b*-1 of the grating portion 3*d* does not enter into the concave mirror, but is returned in the direction of incidence. Likewise, the ray of light which has arrived at the other inclined surface 30*b*-2 constituting the V-groove repeats total reflection and is returned. Accordingly, the light beam arriving at the range of the two inclined surfaces 30*b*-1 and 30*b*-2 forming the V-groove in the first area 3*a* does not enter into the optical scale 3 but is reflected, and only the ray of light which has arrived at the flat surface portion 30*a* travels through the optical scale 3.

That is, in the first area 3*a*, the grating portion 3*d* of the V-groove type has optical action similar to that of an amplitude diffraction grating of the transmission type. The light beam is diffracted by this grating portion 3*d* of the first area 3*a*, and 0th-order, ±first-order, ±second-order, . . . diffracted lights are created by the action of the grating portion and the diffracted lights are condensed on the surface of the concave mirror 4. The condensed diffracted lights are reflected by the concave mirror 4 decentered relative to the principal ray 101*a*, and are imaged on the second area 3*b* of the optical scale 3 and form images (the images of radial grooves) on the surface of the optical scale 3.

Here, the first area 3*a* and the second area 3*b* are areas which are radially different relative to the grating portion 3*d* of the radial grating on the surface of the optical scale 3 (or which may partly overlap each other). At this time, the grating pitches of the first area 3*a* and the second area 3*b* differ from each other because the optical scale 3 has the radial grating portion 3*d*. Further, in the irradiated area of the second area 3*b*, the pitches of the inner peripheral side and the outer peripheral side of the optical scale 3 differ from each other.

Then, in the present embodiment, the grating portion of the first area 3*a* is enlargedly projected onto the second area 3*b* on the grating portion 3*d* so as to form an image (inverted image) similar to the pitch of the radial grating portion 3*d* of the optical scale 3. For that purpose, in the present embodiment, the concave mirror 4 is set to have a desired radius of curvature R and is disposed eccentrically with respect to the principal ray 101*a* of the incident light beam and the amount of deviation Δ relative to the incidence optical axis is selected to an optimum value.

Thereby, when the image of the grating portion of the first area 3*a* is formed on the surface of the second area 3*b* by the concave mirror 4, a detection signal of good S/N ratio is obtained in such a manner that this image and the pitch of at least a portion of the radial grating coincide with each other.

The light beam which has entered the flat surface portion 30*a* in the second area 3*b* is rectilinearly transmitted therethrough as shown in FIG. 11B, and arrives at the central photodetector 5*c* of the light receiving means 5 through the lens system 2. Also, the rays of light which have arrived at the two inclined surfaces 30*b*-1 and 30*b*-2 forming the groove surface are incident thereon at an angle of incidence of 45° and therefore are greatly refracted in different directions and arrive at the photodetectors 5*a* and 5*b* at the opposite sides of the light receiving means 5 through the lens system 2.

Thus, in the second area 3*b*, the light beam is divided into three directions and travels by the three kinds of surfaces differing in the direction of inclination from one another, i.e., the two inclined surfaces 30*b*-1 and 30*b*-2 inclined in different directions with respect to the incident light beam and the flat surface portion 30*a* between the V-grooves, and arrives at the photodetectors 5*a*, 5*b* and 5*c* provided at positions corresponding to the respective surfaces. That is, in the second area 3*b*, the grating portion 3*d* of the V-groove functions as a light wavefront dividing element.

That is, the light beam based on the phase relation between the grating portion of the second area 3*b* and an interference pattern image formed on the surface thereof is deflected in three directions and enters the photodetectors 5*a*, 5*b* and 5*c*.

When the optical scale 3 is rotated, the quantities of light detected by the respective photodetectors 5*a*, 5*b* and 5*c* change. The balance among the quantities of light entering the photodetectors changes in conformity with the relative displacement of the position of the grating portion 3*d* and the position of the image and as the result, assuming that the optical scale 3 has been rotated counter-clockwisely, there is obtained a change in the quantity of light resulting from the rotation of the optical scale 3 as shown in FIG. 11C. In FIG. 11C, the axis of abscissas represents the amount of rotation of the optical scale 3 and the axis of ordinates represents the quantity of received light.

Signals a, b and c correspond to the photodetectors 5*a*, 5*b* and 5*c*, respectively. When conversely, the optical scale 3 has been rotated clockwisely, the signal a becomes the output of the photodetector 5*b* and the signal b becomes the output of the photo-detector 5*a* and the signal c becomes the output of the photodetector 5*c*. On the basis of these signals, there is obtained rotation information such as the angle of rotation and the amount of rotation or the rotational speed and the rotational acceleration of the optical scale 3.

FIG. 11C shows the state of a theoretical change in quantity of light when the contrast of the image formed on the second area 3*b* is very high and nearly ideal.

FIGS. 13 and 14 show the scale pitch of the grating portion with respect to the distance from the incident principal ray in the second area 3*b* in the case of 2500 pulses (2500 P/R) and 5000 pulses (5000 P/R) per round as the grating portion on the optical scale 3 in the present embodiment and when the principal ray 101*a* of the light beam 101 incident on the first area 3*a* of the optical scale 3 is decentered by Δ (when the decentered amount is Δ) with respect to the optical axis 4*a* of the concave mirror 4 when it is reflected by the concave mirror 4 and enters the second area 3*b*.

Also, FIGS. 13 and 14 show the superposed pitch with respect to the distance from the incident principal ray of the image of the grating portion when by the concave mirror 4, the grating portion of the first area 3*a* is formed on the second area 3*b* when the decentered amount is Δ.

As shown in FIGS. 13 and 14, when the decentered amount Δ is Δ: 0.62 (nm), the distance of the second area 3*b* from the incident principal ray is in the vicinity of 1.8 mm and the scale pitch and the superposed pitch are substantially coincident with each other.

In the present embodiment, an area of which the distance from the incident principal ray 101*a* is in the vicinity of 1.8 mm is utilized.

In the present embodiment, design is made such that by the lens system 2, the light source 1 and the reflecting surface 4*a* of the concave mirror 4 become substantially conjugate with each other and that ±nth-order diffracted lights from the optical scale 3 are condensed on or near the reflecting surface 4*a* of the concave mirror 4. Design is also made such that a portion of the optical scale 3 coincides with the center of curvature of the concave mirror 4.

Thereby, the error of the displacement information obtained by the light receiving means 5 is made small even if the gap between the optical scale 3 and the concave mirror 4 is more or less displaced from its set value. That is, the allowable value of the gap characteristic is alleviated.

Figure 15B:
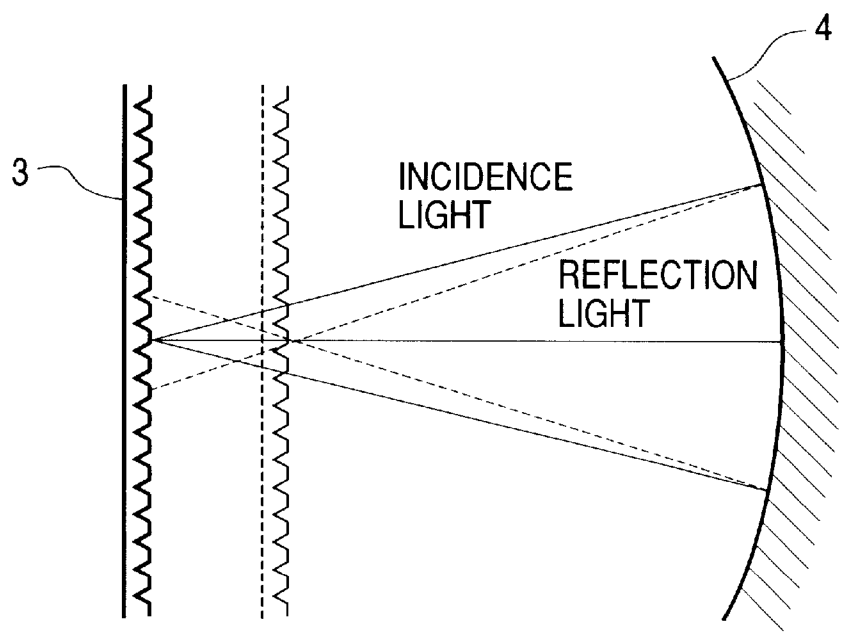

FIGS. 15A and 15B are illustrations of the incident light and reflected light when there is an error in the gap between the optical scale 3 and the concave mirror 4.

When as shown in FIG. 15A, the optical scale 3 is at the position of the radius of curvature of the concave mirror 4, i.e., the position of the best gap, the diffracted light diffracted by the V-groove is reflected by the concave mirror 4 and is condensed on the surface of the optical scale 3 and therefore, the contrast of the interference fringes exhibits a maximum value.

However, when as shown in FIG. 15B, the optical scale 3 is displaced from the position of the best gap, the diffracted light is not condensed on the optical scale 3 after it is reflected on the surface of the optical scale 3 by the concave mirror 4 and therefore, the contrast of the interference pattern is reduced.

Such a reduction in the contrast of the interference pattern is operatively associated with a reduction in the output signal detected by the light receiving means and therefore, how much the contrast is reduced by the optical scale deviating from the best gap becomes an important value.

Then, in the present embodiment, design is made such that the center of curvature of the concave mirror 4 is positioned near a point on the optical scale 3 and that the light source 1 and the concave mirror 4 become substantially conjugate with each other by the lens system 2, whereby the reduction in the contrast when the optical scale 3 is displaced from the best gap is made small and a signal of good S/N ratio is obtained.

In the present embodiment, as described above, the incidence position of the principal ray when it enters the optical scale and is reflected by the concave mirror and re-enters the optical scale is set so as to differ in the radial direction, whereby the degree of freedom of the disposition of the light source, the optical scale, the light receiving means, etc. is increased and the downsizing of the entire apparatus is achieved, and yet the rotation information of the rotatable object (optical scale) is detected highly accurately.

Also, design is made such that the light source and the concave mirror become substantially conjugate with each other by the lens system and further, a portion of the optical scale is set so as to be substantially the position of the radius of curvature of the concave mirror to thereby achieve the alleviation of the allowable value from the design value of the gap between the optical scale and the concave mirror.

FIGS. 16A to 16C and 17A to 17C are illustrations showing the optical path, in another embodiment, of a light beam 102 diffracted and imaged on the surface of the concave mirror 4 and reflected by the concave mirror 4 and passing through the second area 3*b* of the optical scale 3 after in the present embodiment, a light beam 101 emitted from the light source and passed through the lens system has entered the first area 3*a* of the optical scale 3.

FIGS. 16A, 16B and 16C show a case where the light beam 101 passed through the lens system enters from the first area 3*a* nearer to the rotary axis 3*e* on the grating portion of the optical scale 3 and is reflected by the concave mirror 4 and re-enters the second area 3*b* farther from the rotary axis 3*e*.

That is, these figures show a case where by the concave mirror 4, the grating portion of the first area 3*a* is enlargedly imaged on the second area 3*b*. FIG. 16A shows a case where the light beam 101 enters the first area 3*a* perpendicularly thereto and is reflected by the concave mirror 4, and thereafter obliquely enters the second area 3*b*, and FIGS. 16B and 16C show a case where the light beam 101 obliquely enters the first area 3*a* and the second area 3*b*, respectively.

FIGS. 17A, 17B and 17C show a case where the light beam 101 passed through the lens system enters from the first area 3*a* farther from the rotary axis 3*e* on the grating portion of the optical scale 3 and is reflected by the concave mirror 4 and re-enters the second area 3*b* nearer to the rotary axis 3*e*.

That is, these figures show a case where by the concave mirror 4, the grating portion of the first area 3*a* is reducedly imaged on the second area 3*b*. FIG. 17A shows a case where the light beam 101 obliquely enters the first area 3*a* and is reflected by the concave mirror 4, and thereafter enters the second area 3*b* perpendicularly thereto, and FIGS. 17B and 17C show a case where the light beam 101 obliquely enters the first area 3*a* and the second area 3*b*, respectively. Again in the construction of FIGS. 16A to 16C and 17A to 17C, an effect similar to that of the aforedescribed Embodiment 2 is obtained.

Figure 18:
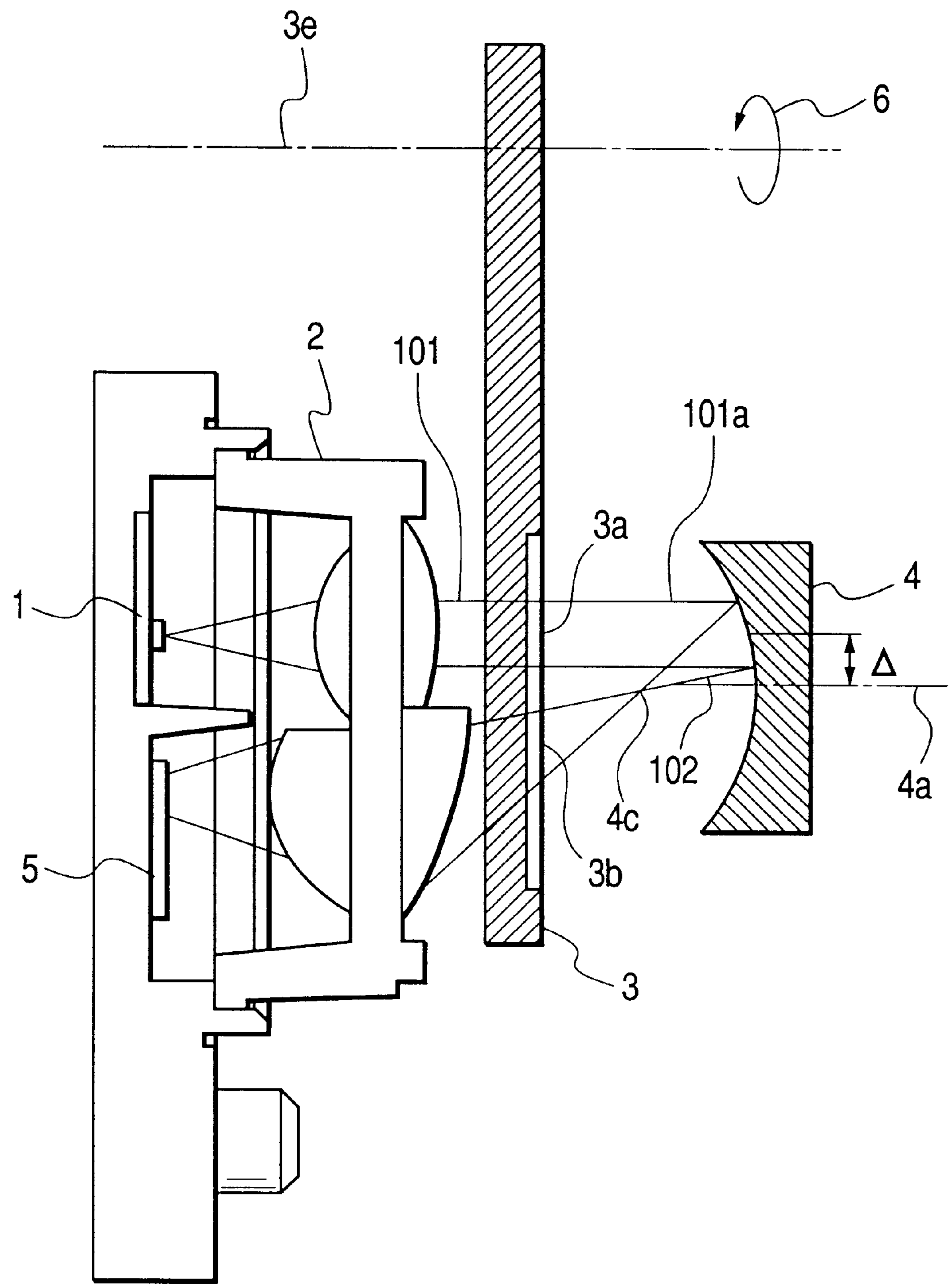
FIG. 18 is a cross-sectional view of the essential portions of Embodiment 3 of the present invention.

FIG. 18 is a schematic view of the essential portions of Embodiment 3 of the present invention. This embodiment differs from Embodiment 2 shown in FIGS. 6 to 10, 11A to 11C, 12 to 14, 15A, 15B, 16A to 16C and 17A to 17C only in that a light beam from light illuminating means 1 is made to enter the first area 3*a* of the optical scale 3 as a parallel light beam by the lens system 2; and that 0th-order light and ±nth-order diffracted lights from the first area 3*a* of the optical scale 3 are condensed at the focus position of the concave mirror 4 by the concave mirror 4, and thereafter are made to enter the second area 3*b* of the optical scale 3 as divergent lights to thereby form interference fringes on the surface thereof;

and in the other points, the construction of this embodiment is the same as that of Embodiment 2.

That is, in the present embodiment, as shown in FIG. 18, the light beam from the light illuminating means 1 is collimated by the lens system and is made to enter the first area 3*a* on the rotatable optical scale 3 in which a grating portion having radial V-grooves disposed at a predetermined period is provided on the circumference of a disc, and diffracted light diffracted by the grating portion of the first area 3*a* is reflected by the concave mirror 4 and is condensed at the focus position 4*c* thereof, whereafter it is made to enter the second area 3*b* of the optical scale as divergent light, and the light beam passed through the grating portion of the second area 3*b* is received by the light receiving means 5 to thereby detect the displacement information of the optical scale 3.

At this time, the first area 3*a* and the second area 3*b* are positioned in different areas with respect to the radial direction of the rotary axis 3*e* of the optical scale 3, and the concave mirror 4 forms an image of the first area 3*a* of the optical scale 3 on the second area 3*b* by a decentering system.

Figure 19:
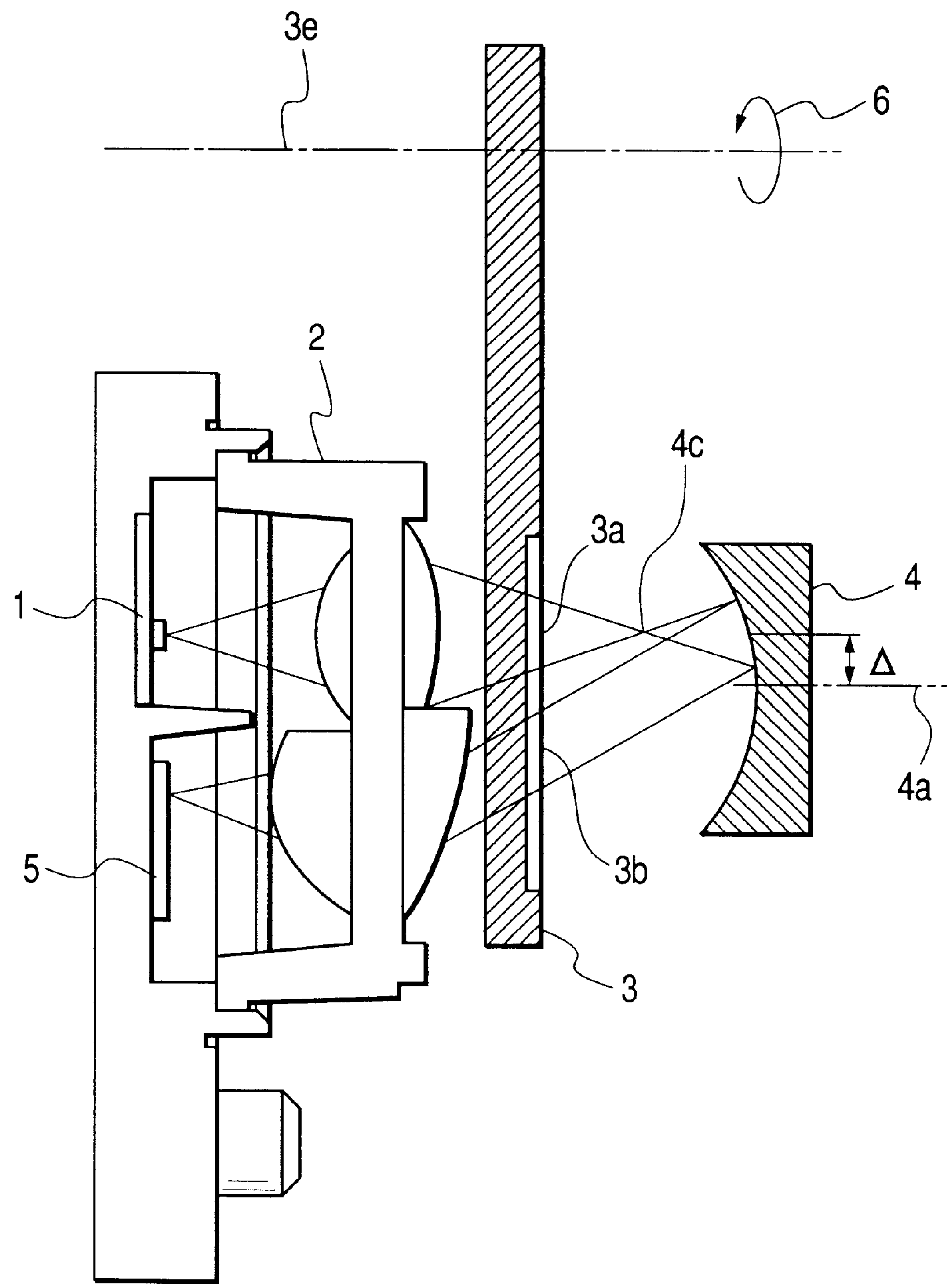
FIG. 19 is a cross-sectional view of the essential portions of Embodiment 4 of the present invention.

FIG. 19 is a schematic view of the essential portions of Embodiment 4 of the present invention. This embodiment differs from Embodiment 2 shown in FIGS. 6 to 10, 11A to 11C, 12 to 14, 15A, 15B, 16A to 16C, 17A to 17C only in that design is made such that when the light beam from the light illuminating means 1 is condensed by the lens system 2 and is made to enter the first area 3*a* of the optical scale 3, it is condensed at the focus position 4*c* of the concave mirror 4; and that the diffracted light from the first area 3*a* of the optical scale 3 is condensed at the focus position 4*c*, whereafter it becomes divergent light and is reflected by the concave mirror 4, and thereafter becomes a parallel light beam and enters the second area 3*b* of the optical scale 3, and forms interference fringes on the surface thereof;

and in the other points, the construction of this embodiment is the same as that of Embodiment 2.

That is, in the present embodiment, as shown in FIG. 19, the light beam from the light illuminating means 1 is condensed by the lens system 2 and is made to enter the first area 3*a* on the rotatable optical scale 3 in which a grating portion having radial V-grooves disposed at a predetermined period is provided on the circumference of a disc, and the diffracted light diffracted by the grating portion of the first area 3*a* is condensed at the focus position 4*c* of the concave mirror 4, whereafter it is reflected as a divergent light beam by the concave mirror 4 and is collimated, and thereafter is made to enter the second area 3*b* of the optical scale 3, and the light beam passed through the grating portion of the second area 3*b* is received by the light receiving means 5 to thereby detect the displacement information of the optical scale 3.

At this time, the first area 3*a* and the second area 3*b* are positioned in different areas with respect to the radial direction of the rotary axis 3*e* of the optical scale 3, and the concave mirror 4 images the first area 3*a* of the optical scale 3 on the second area 3*b* by the decentering system.

Figure 20:
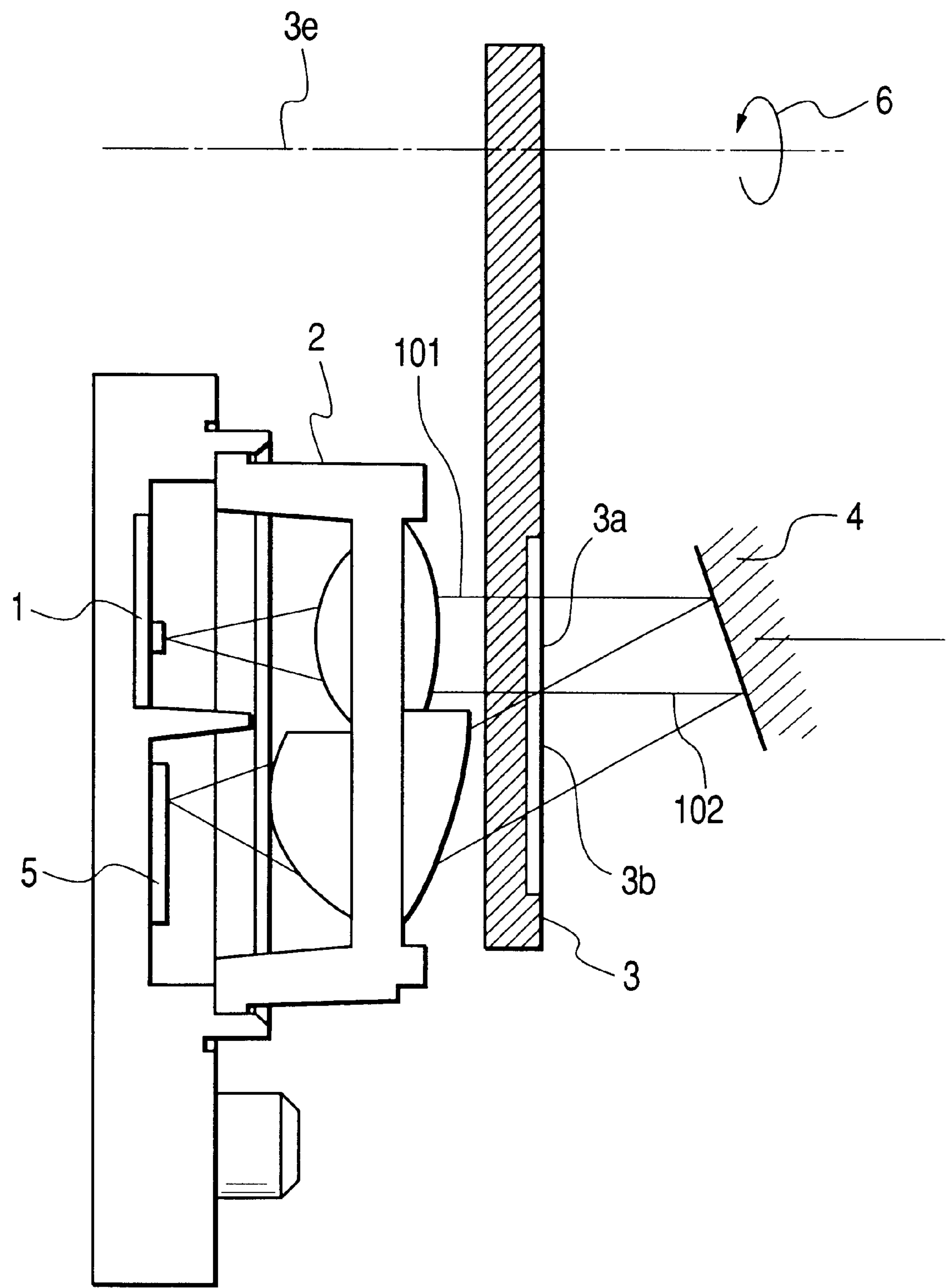
FIG. 20 is a cross-sectional view of the essential portions of Embodiment 5 of the present invention.

FIG. 20 is a schematic view of the essential portions of Embodiment 5 of the present invention, and FIG. 21 is an enlarged perspective view of a portion of FIG. 20. This embodiment differs from Embodiment 2 shown in FIGS. 6 to 10, 11A to 11C, 12 to 14, 15A, 15B, 16A to 16C, 17A to 17C only in

- that the light beam from the light illuminating means 1 is collimated by the lens system 2 and is made to enter the first area 3*a* of the optical scale 3; and
- that the parallel lights of 0th-order light and ±nth-order diffracted lights diffracted by the grating portion of the first area 3*a* are reflected by plane mirrors 41, 42 and 43, respectively, and are made to enter the second area 3*b* of the optical scale 3 to thereby form interference fringes on the surface thereof;
- and in the other points, the construction of this embodiment is the same as that of Embodiment 2.

That is, in the present embodiment, as shown in FIGS. 20 and 21, the light beam from the light illuminating means 1 is made into a parallel light beam 101 by the lens system 2 and is made to enter the first area 3*a* on the movable optical scale 3 in which a grating portion having straight V-grooves disposed at a predetermined period is provided on a base plate, and the parallel lights of 0th-order light L(0) and ±nth-order (n=1) diffracted lights L(+) and L(−1) diffracted by the grating portion of the first area 3*a* are reflected by the plane mirrors 41, 42 and 43, respectively, and are made to enter the second area 3*b* of the optical scale 3, and the light beam passed through the grating portion of the second area 3*b* is received by the light receiving means 5 to thereby detect the displacement information of the optical scale 3.

The first area 3*a* and the second area 3*b* are positioned in different areas with respect to the radial direction of the rotary axis 3*e* of the optical scale 3.

In each embodiment, the diffracted light passed through the first area of the optical scale 3 may be three or more light beams.

In the present invention, a V-groove grating having a V-shaped cross-section is used as the grating portion for detecting the phase difference of the optical scale, but any grating of other shape and functionally similar to the V-groove grating is likewise applicable.

For example, optical scales having grating portions may be used as shown in FIGS. 22A, 22B, 23A, 23B, 24A, 24B, 25A, 25B, 26A and 26B.

Figure 22A:
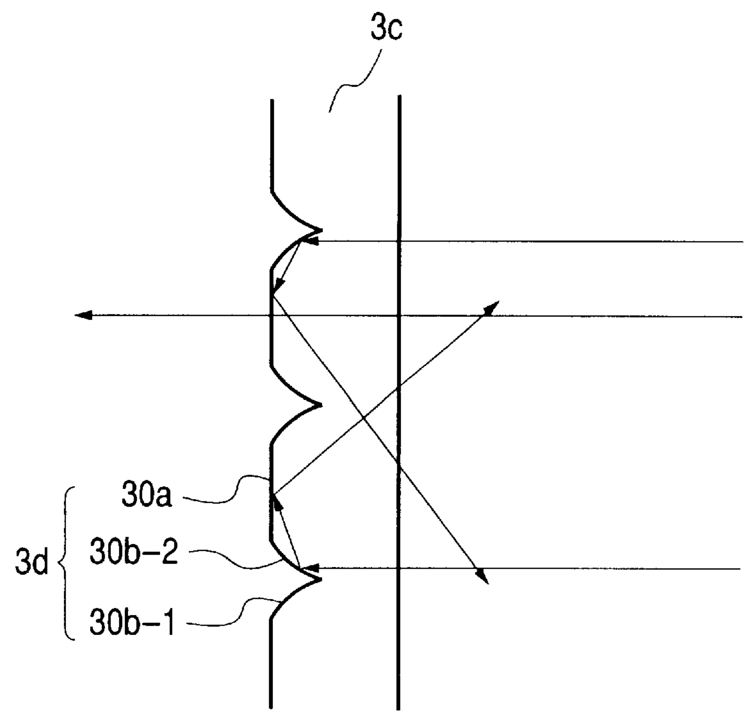
FIGS. 22A and 22B are illustrations of another embodiment of the optical scale according to the present invention.
Figure 22B:
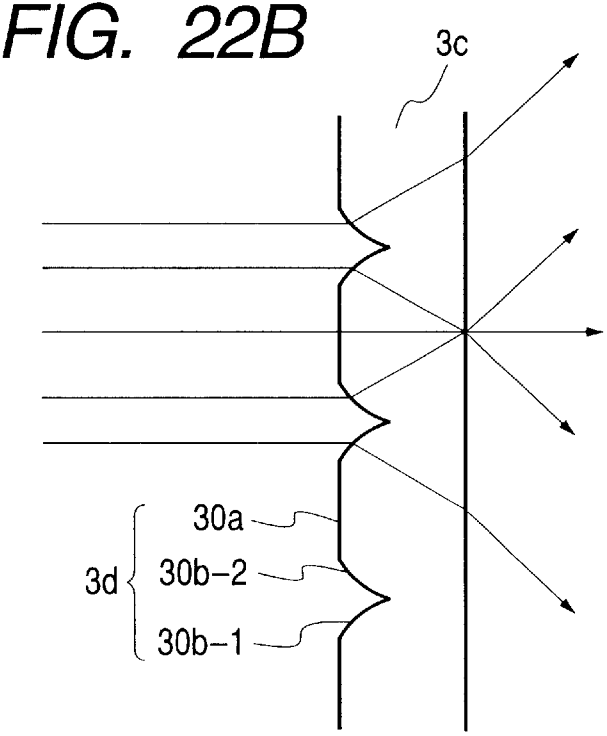

FIGS. 22A and 22B are cross-sectional views of the essential portions of another embodiment of the grating portion 3*d* of the optical scale 3 according to the present invention. This embodiment differs from the embodiment shown in FIGS. 11A to 11C in that the grating portion 3*d* is constituted by curved surfaces having a curvature, instead of the flat inclined surfaces.

That is, a grating portion 3*d* comprising a plurality of radial gratings arranged at a predetermined period is provided on the surface of a disc-like base plate 3*c*. This grating portion 3*d* is comprised of a flat surface portion 30*a* and two curved surfaces 30*b*-1 and 30*b*-2 having a curvature alternately arranged at a predetermined pitch.

The area of FIG. 22A corresponds to the first area 3*a*, and FIG. 22A shows a state in which only a light beam having entered the flat surface portion 30*a* of the grating portion 3*d* passes through the optical scale 3 and a light beam having entered the curved surface 30*b*-1 (30*b*-2) is totally reflected by the curved surface 30*b*-1 (30*b*-2) and the flat surface portion 30*a* and is being returned in the direction of incidence.

FIG. 22B shows the optical path of a light beam having entered the second area 3*b* of the optical scale. Thus, the grating portion 3*d*, like that shown in FIGS. 11A and 11B, has optical action similar to that of a transmission type amplitude diffraction grating.

Figure 23A:
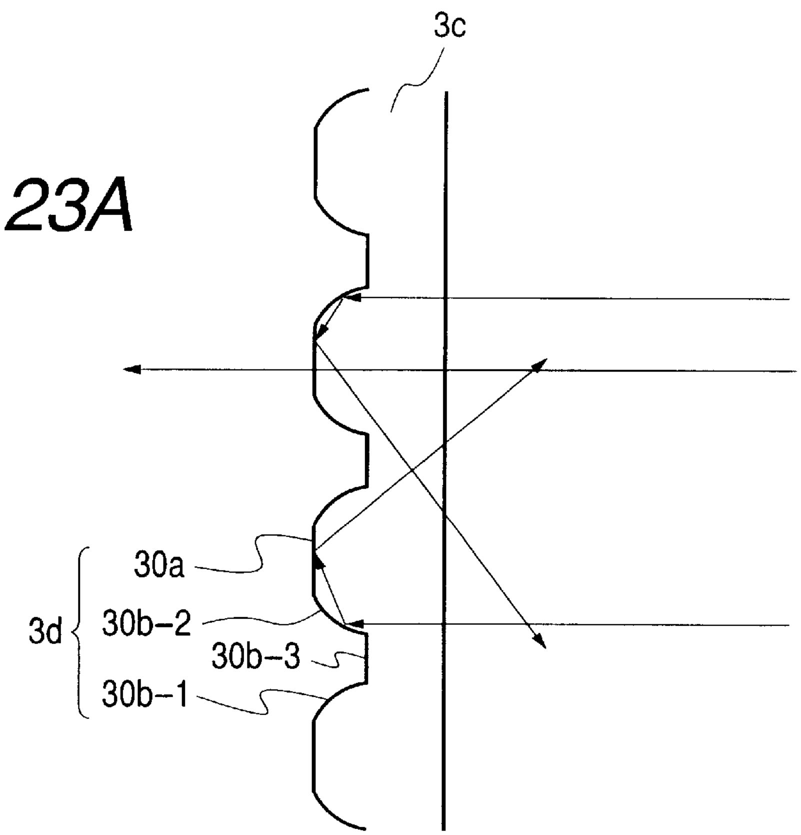
FIGS. 23A and 23B are illustrations of another embodiment of the optical scale according to the present invention.
Figure 23B:
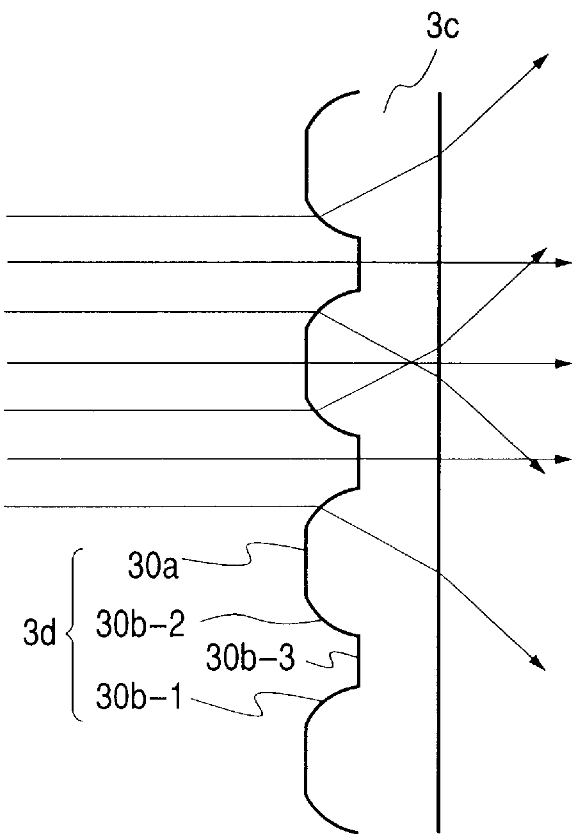

FIGS. 23A and 23B are cross-sectional views of the essential portions of another embodiment of the grating portion 3*d* of the optical scale 3 according to the present invention. This embodiment differs from the embodiment shown in FIGS. 11A to 11C in that the grating portion 3*d* is constituted by curved surfaces 30*b*-1 and 30*b*-2 having a curvature, instead of the flat inclined surfaces, and a flat surface portion 30*b*-3 is formed between the curved surfaces, and in the other points, the construction of this embodiment is the same as that of the embodiment shown in FIGS. 11A to 11C.

That is, a grating portion 3*d* comprising a plurality of radial gratings arranged at a predetermined period is provided on the surface of a disc-like base plate 3*c*. This grating portion 3*d* is comprised of a flat surface portion 30*a*, two curved surfaces 30*b*-1 and 30*b*-2 having a curvature and a flat surface portion 30*b*-3 alternately arranged at a predetermined pitch P.

The area of FIG. 23A corresponds to the first area 3*a*, and FIG. 23A shows a state in which only light beams having entered the flat surface portion 30*a* and flat surface portion 30*b*-3 of the grating portion 3*d* pass through the optical scale 3 and a light beam having entered the curved surface 30*b*-1 (30*b*-2) is totally reflected by the curved surface 30*b*-1 (30*b*-2) and the flat surface portion 30*a* and is being returned in the direction of incidence.

FIG. 23B shows the optical path of a light beam having entered the second area 3*b* of the optical scale. Thus, the grating portion 3*d*, like that shown in FIGS. 11A and 11B, has optical action similar to that of a transmission type amplitude diffraction grating.

Figure 24A:
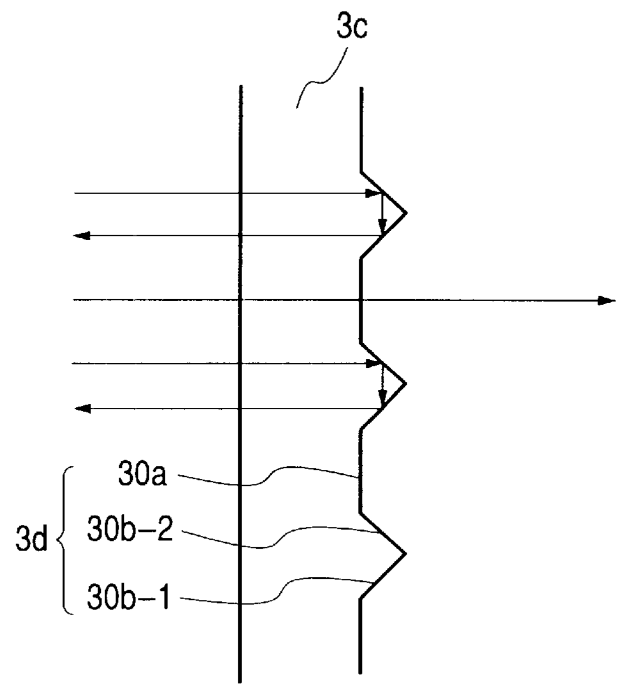
FIGS. 24A and 24B are illustrations of another embodiment of the optical scale according to the present invention.
Figure 24B:
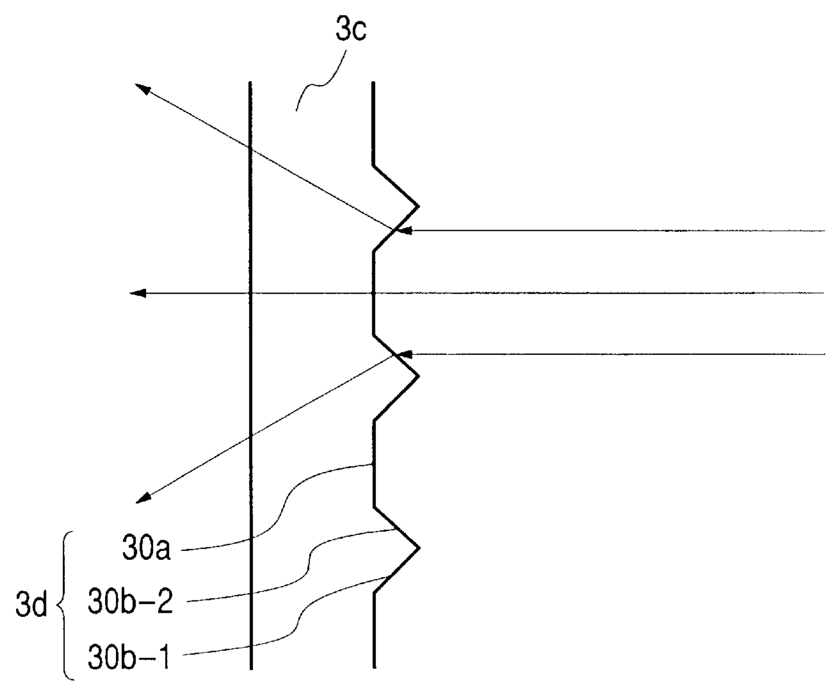

FIGS. 24A and 24B are cross-sectional views of the essential portions of another embodiment of the grating portion 3*d* of the optical scale 3 according to the present invention. This embodiment differs from the embodiment of FIG. 6 in that the grating portion is constituted by triangular protruding portions (30*b*-1, 30*b*-2) instead of the V-grooves, and in the order points, the construction of this embodiment is the same as that of the embodiment of FIG. 6.

That is, a grating portion 3*d* comprising a plurality of radial gratings arranged at a predetermined period is provided on the surface of a disc-like base plate 3*c*. This grating portion 3*d* is comprised of a flat surface portion 30*a* and two flat surface portions 30*b*-1 and 30*b*-2 each comprising a flat surface alternately arranged at a predetermined pitch P.

The area of FIG. 24A corresponds to the first area 3*a*, and FIG. 24A shows a state in which only a light beam having entered the flat surface portion 30*a* of the grating portion 3*d* passes through the optical scale 3 and a light beam having entered the flat surface portion 30*b*-1 (30*b*-2) is totally reflected by the other flat surface portion 30*b*-2 (30*b*-1) and is being returned in the direction of incidence.

FIG. 24B shows the optical path of a light beam having entered the second area 3*b* of the optical scale. Thus, the grating portion 3*d*, like that shown in FIGS. 11A and 11B, has optical action similar to that of a transmission type amplitude diffraction grating.

Figure 25A:
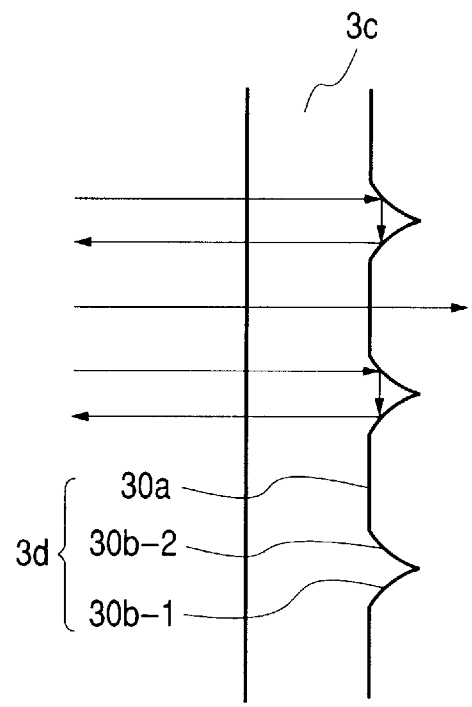
FIGS. 25A and 25B are illustrations of another embodiment of the optical scale according to the present invention.
Figure 25B:
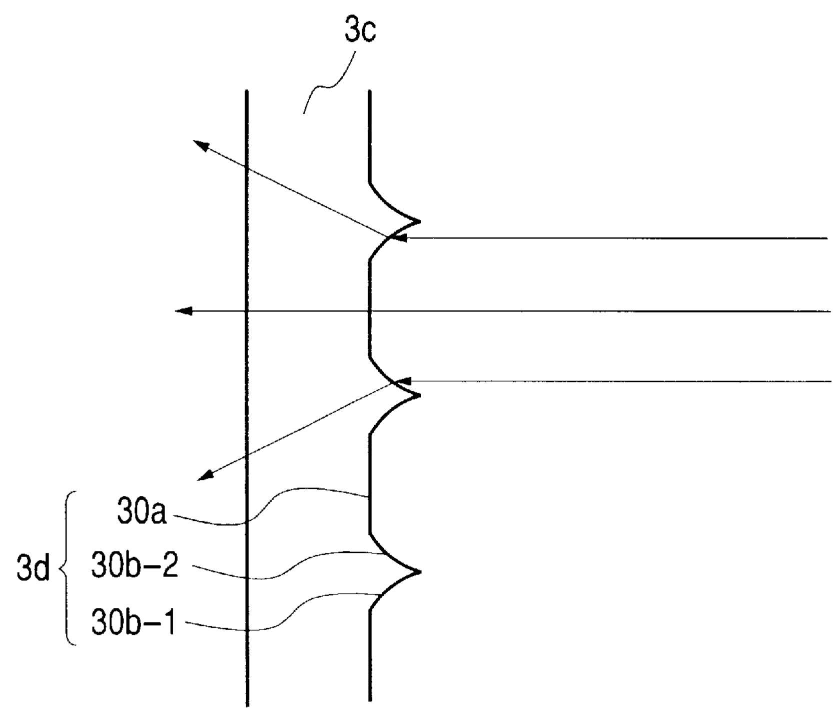

FIGS. 25A and 25B are cross-sectional views of the essential portions of another embodiment of the grating portion 3*d* of the optical scale 3 according to the present invention. This embodiment differs from the embodiment of FIGS. 11A to 11C in that a protruding portion comprising two curved surfaces 30*b*-1 and 30*b*-2 each having a curvature is formed instead of the V-groove, and in the other points, the construction of this embodiment is the same as that of the FIGS. 11A to 11C embodiments.

That is, a grating portion 3*d* comprising a plurality of radial gratings arranged at a predetermined period is provided on the surface of a disc-like base plate 3*c*. This grating portion 3*d* is comprised of a flat surface portion 30*a* and two protruding curved surfaces 30*b*-1 and 30*b*-2 having a curvature alternately arranged at a predetermined pitch P.

The area of FIG. 25A corresponds to the first area 3*a*, and shows a state in which only a light beam having entered the flat surface portion 30*a* of the grating portion 3*d* passes through the optical scale 3 and a light beam having entered the curved surface 30*b*-1 (30*b*-2) is totally reflected by the curved surface 30*b*-1 (30*b*-2) and is being returned in the direction of incidence.

FIG. 25B shows the optical path of a light beam having entered the second area 3*b* of the optical scale. Thus, the grating portion 3*d*, like that shown in FIGS. 11A and 11B, has optical action similar to that of a transmission type amplitude diffraction grating.

Figure 26A:
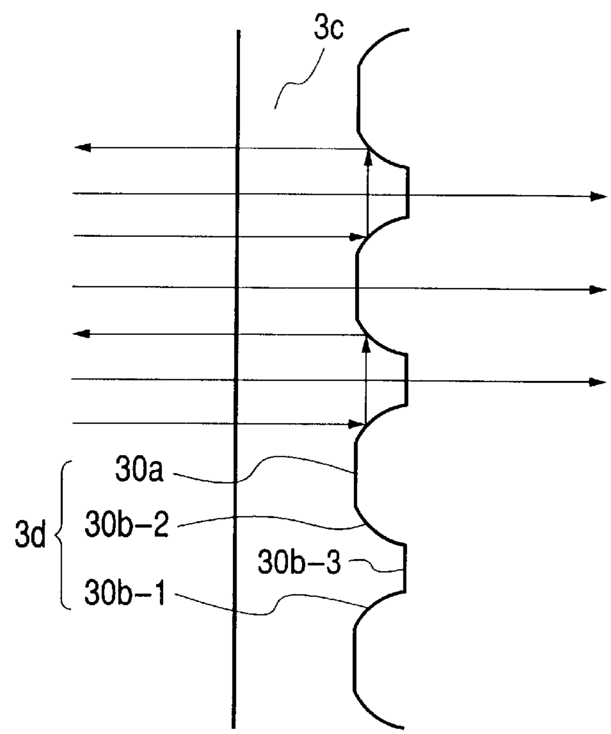
FIGS. 26A and 26B are illustrations of another embodiment of the optical scale according to the present invention.
Figure 26B:
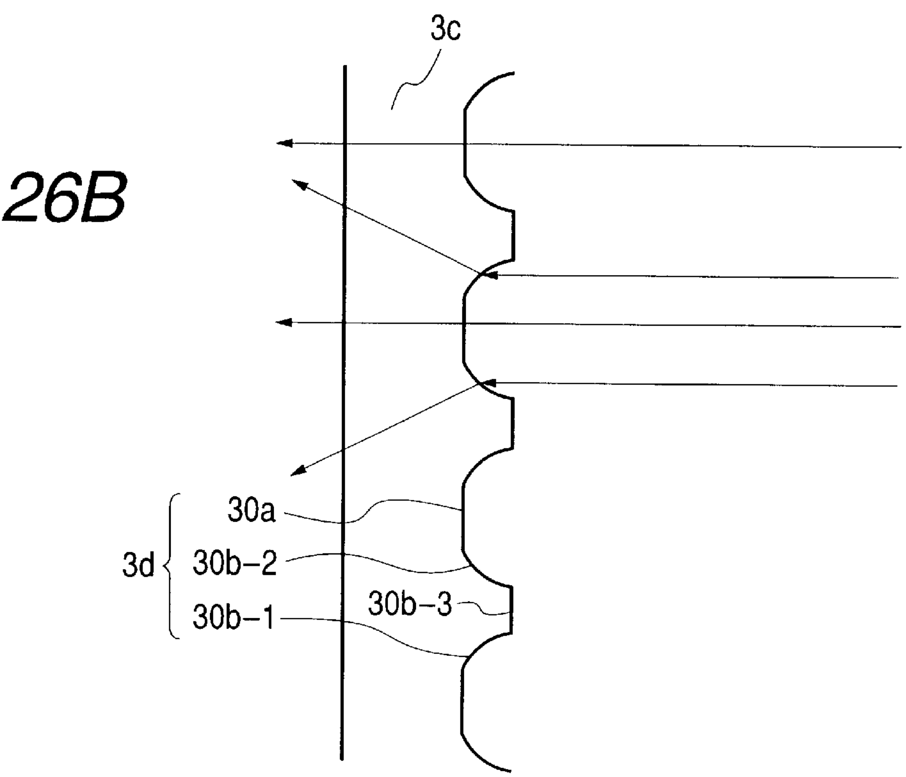

FIGS. 26A and 26B are cross-sectional views of the essential portions of another embodiment of the grating portion 3*d* of the optical scale 3 according to the present invention. This embodiment differs from the embodiment shown in FIGS. 11A to 11C in that the grating portion 3*d* is constituted by curved surfaces 30*b*-1 and 30*b*-2 having a curvature, instead of the inclined surfaces each comprising a flat surface, and a flat surface portion 30*b*-3 is formed between the curved surfaces, and in the other points, the construction of this embodiment is the same as that of the FIGS. 11A to 11C embodiments.

That is, a grating portion 3*d* comprising a plurality of radial gratings arranged at a predetermined period is provided on the surface of a disc-like base plate 3*c*. This grating portion 3*d* is comprised of a flat surface portion 30*a* and two curved surfaces 30*b*-l and 30*b*-2 having a curvature alternately arranged at a predetermined pitch P.

FIG. 26A corresponds to the first area 3*a*, and shows a state in which only light beams having entered the flat surface portion 30*a* and flat surface portion 30*b*-3 of the grating portion 3*d* pass through the optical scale 3 and a light beam having entered the curved surface 30*b*-1 (30*b*-2) is totally reflected by the curved surface 30*b*-1 (30*b*-2) and the curved surface 30*b*-2 (30*b*-1) and is being returned in the direction of incidence.

FIG. 26B shows the optical path of a light beam having entered the second area 3*b* of the optical scale. Thus, the grating portion 3*d*, like that shown in FIGS. 11A and 11B, has optical action similar to that of a transmission type amplitude diffraction grating.

According to each of the above-described embodiment, phase difference detection by the self-projection type detection system which has heretofore been apt to become complicated in construction can be easily realized and further, it has become possible to provide a self-projection type detecting apparatus which is compact but yet makes a position of high resolving power detectable.

Particularly, the first and second areas are disposed in a direction perpendicular to the direction of grating arrangement which is a direction in which light beams spread to each other by wavefront division, whereby it becomes possible to dispose the light beam illuminating means to the scale and the light receiving means without providing so much space therebetween, and a more compact construction can be realized.

Also, particularly, by a construction in which the diffracted light from the grating portion in the first area is condensed and reflected near the concave mirror, and in the second area which is in a direction perpendicular to the movement of the first area, an image is formed at such a magnification that it becomes substantially the same size as the second area, and the light from the second area is received, there can be achieved a displacement information detecting apparatus suitable for an encoder in which the space for the disposition of each member is reduced and the simplification of the entire apparatus is contrived and also the allowable error of the disposition of each member is alleviated and yet which detects the displacement information of a displaceable object highly accurately.

What is claimed is:

1. A displacement information detecting apparatus comprising:

a displaceable scale member including (i) a first area movable in the displacement direction, provided with a grating portion having a diffraction function as a first light beam dividing function and arranged in the displacement direction, and (ii) a second area, movable in the same direction as the first area, arranged at a position located in a direction perpendicular to the displacement direction relative to the first area and provided with a refracting and splitting function as a second light beam dividing function;

a light beam illuminating system for making a light beam enter the first area of said scale member;

a reflective member for reflecting the light beam having emerged from the first area to enter the second area; and a plurality of light receiving portions for receiving a plurality of light beams created by the second light beam dividing function in the second area, a signal corresponding to a displacement of the scale member provided by the light received by each of said light receiving portions.

2. An apparatus according to claim 1, wherein the grating portion has a periodic structure of flat regions and V-shaped groove regions, a light beam being emitted in a different direction from the surface of each of the regions to thereby perform wavefront division.

3. An apparatus according to claim 1, wherein the grating portion functions as an amplitude grating in the first area.

4. An apparatus according to claim 1, wherein the displacement relative to the scale member is relative linear movement displacement information.

5. An apparatus according to claim 1, wherein the displacement relative to said scale member is relative rotational displacement information.

6. A displacement information detecting apparatus comprising:

a displaceable scale member including (i) a first area movable in the displacement direction, provided with a grating portion having a diffraction function as a first light beam dividing function and arranged in the displacement direction, and (ii) a second area, movable in the same direction as the first area, arranged at a position located in a direction perpendicular to the displacement direction relative to the first area and provided with a reflecting and splitting function as a second light beam dividing function;

a light beam illuminating system for making a light beam enter the first area of said scale member;

a reflective member for reflecting the light beam having emerged from the first area to enter the second area; and a plurality of light receiving portions for receiving a plurality of light beams created by the second light beam dividing function in the second area, a signal corresponding to a displacement of the scale member provided by the light received by each of said light receiving portions, wherein said light beam illuminating system applies a condensable light beam to the first area, said reflecting member is a concave mirror, $0^{th}$-order light and ±nth-order diffracted lights from the grating portion in the first area are condensed on or near the surface of said concave mirror, and said concave mirror images the first area on the second area.

7. An apparatus according to claim 6, wherein $0^{th}$-order light and ±nth-order diffracted lights created in the grating portion of the first area by diffraction are reflected by said concave mirror and superposed one upon another to thereby form an interference pattern.

8. An apparatus according to claim 6, wherein the grating portion has a plurality of straight V-shaped groove regions.

9. An apparatus according to claim 6, wherein said light beam illuminating system comprises a light source and a lens system for condensing the light from said light source and making said light source and the reflecting surface of said concave mirror substantially conjugate with each other.

10. An apparatus according to claim 6, wherein a portion of the scale member is positioned at the center of curvature of said concave mirror.

11. A displacement information detecting apparatus comprising:

a displaceable scale member including (i) a first area movable in the displacement direction, provided with a grating portion having a diffraction function as a first light beam dividing function and arranged in the displacement direction, and (ii) a second area, movable in the same direction as the first area, arranged at a position located in a direction perpendicular to the displacement direction relative to the first area and provided with a reflecting and splitting function as a second light beam dividing function;

a light beam illuminating system for making a light beam from a light source enter the first area of said scale member as condensable light by a lens system;

a concave mirror for reflecting the light beam having emerged from the first area to enter the second area, 0th-order light and ±nth-order light from the grating portion of the first area being condensed on or near the surface of said concave mirror, said concave mirror imaging the first area on the second area; and a light receiving portion for receiving the light beam from the second area, a signal corresponding to a displacement of the scale member provided by the light received by said light receiving portion.

12. A displacement information detecting apparatus comprising:

a displaceable scale member provided with a grating portion arranged in a direction of the displacement of the scale member, said displaceable scale member including (i) a first grating area, movable in the displacement direction, having a diffractive light beam dividing function, and (ii) a second grating area, movable in the same direction as the first grating area, arranged at a position located in a direction perpendicular to the displacement direction relative to the first grating area, and having a reflecting-and-splitting light beam dividing function;

a light beam illuminating system for making a light beam enter the first grating area of said scale member;

a reflective member for reflecting the light beam, once emerged from the first grating area, to the second grating area; and a plurality of light receiving portions for receiving a plurality of light beams created by the reflecting-and-splitting light beam dividing function in the second grating area, a signal corresponding to a displacement of the scale member provided by the light received by each of said light receiving portions.

* * * * *

UNITED STATES PATENT AND TRADEMARK OFFICE
CERTIFICATE OF CORRECTION

PATENT NO. : 6,654,128 B2
DATED : November 25, 2003
INVENTOR(S) : Manabu Takayama et al.

It is certified that error appears in the above-identified patent and that said Letters Patent is hereby corrected as shown below:

Title page,
Item [*] Notice, please insert -- This patent issued on a continued prosecution filed under 37 C.F.R. 1.53(d), and is subject to the twenty year patent term provisions of 35 U.S.C. 154(a)(2). --

Column 8,
Line 15, "multification" should read -- multiplication --.

Column 16,
Line 1, "embodiment," should read -- embodiments, --.

Column 17,
Lines 23 and 28, "$0^{th}$-order" should read -- 0th-order --.

Signed and Sealed this

Seventeenth Day of August, 2004

Jon W. Dudas

JON W. DUDAS
*Acting Director of the United States Patent and Trademark Office*